US012595414B2

(12) United States Patent
Bremer et al.

(10) Patent No.: US 12,595,414 B2
(45) Date of Patent: *Apr. 7, 2026

(54) FERROELECTRIC NEMATIC LIQUID CRYSTALLINE MEDIUM

(71) Applicant: MERCK PATENT GMBH, Darmstadt (DE)

(72) Inventors: Matthias Bremer, Darmstadt (DE); Atsutaka Manabe, Darmstadt (DE); Martin Kraska, Darmstadt (DE)

(73) Assignee: MERCK PATENT GMBH, Darmstadt (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/039,838

(22) PCT Filed: Nov. 30, 2021

(86) PCT No.: PCT/EP2021/083543

§ 371 (c)(1),
(2) Date: Jun. 1, 2023

(87) PCT Pub. No.: WO2022/117552

PCT Pub. Date: Jun. 9, 2022

(65) Prior Publication Data

US 2024/0002727 A1 Jan. 4, 2024

(30) Foreign Application Priority Data

Dec. 2, 2020 (EP) .................................... 20211314
May 12, 2021 (EP) .................................... 21173651
Aug. 3, 2021 (EP) .................................... 21189410

(51) Int. Cl.
*C09K 19/20* (2006.01)
*C09K 19/02* (2006.01)
(Continued)

(52) U.S. Cl.
CPC ...... *C09K 19/2007* (2013.01); *C09K 19/0225* (2013.01); *C09K 19/3098* (2013.01);
(Continued)

(58) Field of Classification Search
CPC .................................................... C09K 19/34
See application file for complete search history.

(56) References Cited

U.S. PATENT DOCUMENTS 5,454,975 A 10/1995 Reiffenrath et al.
5,820,782 A 10/1998 Yamada et al.
(Continued)

FOREIGN PATENT DOCUMENTS

CN 104685025 A 6/2015
CN 105121596 A 12/2015
(Continued)

OTHER PUBLICATIONS

International search report PCT/EP2021/083543 dated Feb. 23, 2022 (pp. 1-3).

(Continued)

*Primary Examiner* — Chanceity N Robinson
(74) *Attorney, Agent, or Firm* — Csaba Henter; Millen, White, Zelano & Branigan, P.C.

(57) ABSTRACT

The new LC media exhibit a ferroelectric nematic phase at ambient temperature. They comprise at least one or more
(Continued)

compounds selected from each of formula IA, of formula IB and of the group of formulae IC-1/IC-2/IC-3,

IA

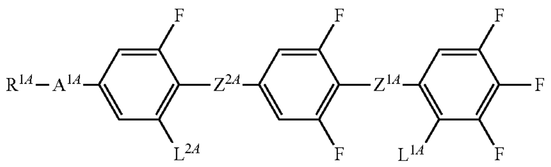

IB

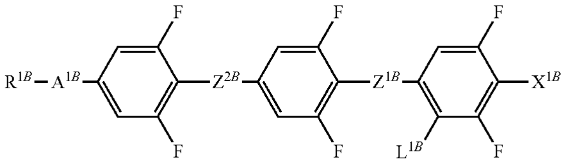

IC-1

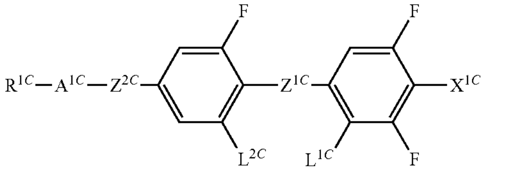

IC-2

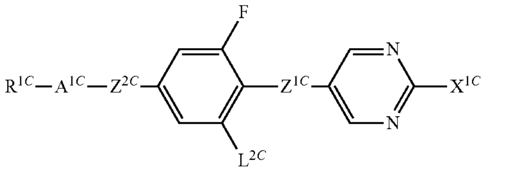

IC-3

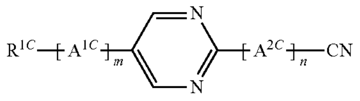

in which the variable groups have the meanings indicated in the text and in the claims. The mixtures are useful for electro-optics, electronics, electro-mechanic and other applications for materials with very high dielectric permittivity and other energy-saving applications.

20 Claims, 1 Drawing Sheet

(51) Int. Cl.

| | |
|---|---|
| ***C09K 19/04*** | (2006.01) |
| ***C09K 19/12*** | (2006.01) |
| ***C09K 19/30*** | (2006.01) |
| ***C09K 19/34*** | (2006.01) |

(52) U.S. Cl.

CPC ...... *C09K 19/3402* (2013.01); *C09K 19/3458* (2013.01); *C09K 2019/0466* (2013.01); *C09K 2019/123* (2013.01); *C09K 2019/2035* (2013.01); *C09K 2019/2042* (2013.01); *C09K 2019/3422* (2013.01)

(56) References Cited

U.S. PATENT DOCUMENTS

| | | | |
|---|---|---|---|
| 7,419,706 | B2 | 9/2008 | Heckmeier et al. |
| 9,120,969 | B2 | 9/2015 | Wittek et al. |
| 9,809,749 | B2 | 11/2017 | Wittek et al. |
| 9,822,305 | B2 | 11/2017 | Wittek et al. |
| 9,938,462 | B2 | 4/2018 | Manabe et al. |
| 9,938,464 | B2 | 4/2018 | Wittek et al. |
| 11,261,163 | B2 | 3/2022 | Bremer et al. |
| 11,692,831 | B2 | 7/2023 | Kaneichi et al. |
| 2013/0057947 | A1 | 3/2013 | Wittek et al. |
| 2021/0163820 | A1 | 6/2021 | Junge et al. |
| 2024/0043747 | A1 | 2/2024 | Bremer et al. |
| 2024/0052242 | A1 | 2/2024 | Bremer et al. |

FOREIGN PATENT DOCUMENTS

| | | | | |
|---|---|---|---|---|
| CN | 111433323 A | | 7/2020 | |
| DE | 19629551 A1 | | 1/1997 | |
| EP | 2708587 A1 | * | 3/2014 | ......... C09K 19/0275 |
| JP | H03264592 A | | 11/1991 | |
| JP | 2009249618 A | | 10/2009 | |
| JP | 2020149124 A | | 9/2020 | |
| KR | 20000059378 A | | 10/2000 | |
| TW | 201932580 A | | 8/2019 | |
| WO | WO-2014053204 A1 | * | 4/2014 | ......... C09K 19/0275 |
| WO | WO-2017020989 A1 | * | 2/2017 | ......... C09K 19/0275 |
| WO | WO-2019110458 A1 | * | 6/2019 | ............. C09K 19/04 |
| WO | WO-2019121368 A1 | * | 6/2019 | ............. C09K 19/02 |

OTHER PUBLICATIONS

Atsutaka Manabe: "Ferroelectric phase at and below room temperature", Liquid Crystals, vol. 48, 2021, pp. 1079-1086.

Li et al., "Development of ferroelectric nematic fluids with giant-□ dielectricity and nonlinear optical properties" Sci. Adv. 2021; 7 : eabf5047 Apr. 21, 2021 (pp. 1-9).

Hiroya Nishikawai, "A Fluid Liquid-Crystal Material with Highly Polar Order" Adv. Mater., vol. 29, 2017, pp. 1702354.

O. D. Lavrentovich, "Ferroelectric nematic liquid crystal, a century in waiting"; PNAS (Jun. 23, 2020), 117 (25), pp. 14021-14031; www.pnas.org/cgi/doi/10.1073/pnas.2008947117.

N. Sebastián et al., "Ferroelectric-Ferroelastic Phase Transition in a Nematic Liquid Crystal"; Physical Review Letters, 2020, 124, 037801-1-037801-6.

Hiroya Nishikawa et al., "A Fluid Liquid-Crystal Material with Highly Polar Order", Adv. Mater, vol. 29, 2017, 1702354.

Japanese Patent Office Notice of Reasons for Rejection dated Jul. 1, 2025 issued in corresponding application 2023-533689.

* cited by examiner

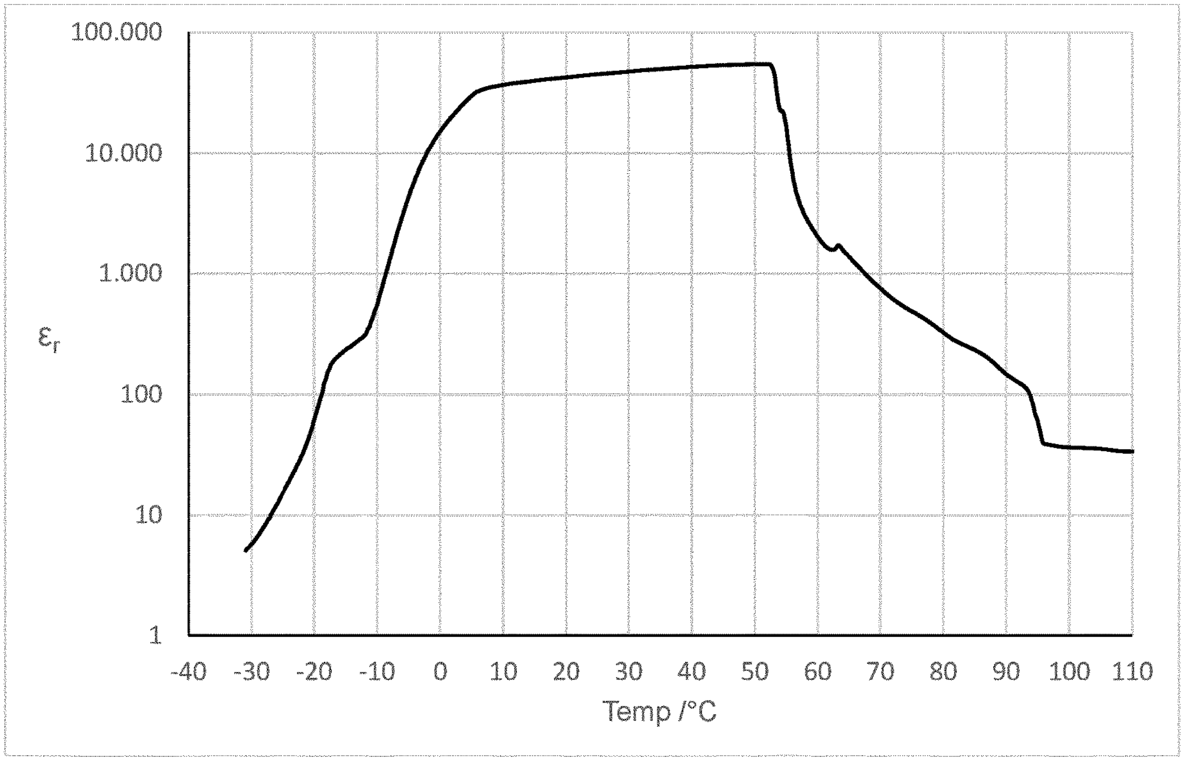
100.000
10.000
1.000
100
10
1
εr
-40
-30
-20
-10
0
10
20
30
40
50
60
70
80
90
100
110
Temp /°C

FERROELECTRIC NEMATIC LIQUID CRYSTALLINE MEDIUM

An aspect of the invention relates to liquid crystalline media exhibiting a ferroelectric nematic liquid crystalline phase over a substantial range of temperatures, preferably at ambient temperature. Preferably these media comprise one or more compounds of each of the formulae IA, IB and IC-1 to IC-3 as defined below. In addition, the present invention relates to liquid crystal displays, electric and electronic elements which contain the liquid crystalline media according to the invention.

In previous years, the areas of application for liquid crystal compounds have been considerably expanded to various types of display devices, electro-optical devices, electronic components, sensors, etc. For this reason, a number of different structures have been proposed, in particular in the area of nematic liquid crystals. The nematic liquid-crystal mixtures have to date found the broadest use in flat-panel display devices. They have been employed, in particular, in passive TN or STN matrix displays or systems having a TFT active matrix, including the well-known TN, IPS, FFS and VA systems.

Most of these devices employ the nematic liquid crystal phase, including all common LCD television sets, LCD desktop monitors and mobile LCD devices. Some alternative liquid crystalline phases are known, like ferroelectric smectic phases or blue phases. However, a ferroelectric nematic phase ($N_f$-LC phase) had been postulated by theory for decades only, without finding a suitable liquid crystalline material with such property.

Only recently, a few chemical structures have been reported to show ferroelectric nematic behaviour.

Firstly, Hiroya Nishikawa, Kazuya Shiroshita, Hiroki Higuchi, Yasushi Okumura, Yasuhiro Haseba, Shin-ichi Yamamoto, Koki Sago, and Hirotsugu Kikuchi, *Adv. Mater.* (2017), 29, 1702354, describe a compound of formula A to have a ferroelectric nematic behaviour at temperatures between about 45° C. to 68° C.

A

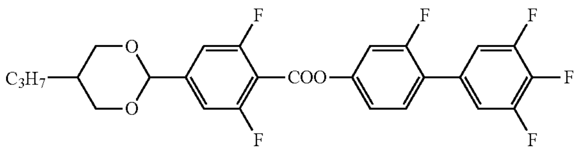

Further, Nerea Sebastián, Luka Cmok, Richard J. Mandle, Maria Rosario de la Fuente, Irena Drevenšek Olenik, Martin Čopič and Alenka Mertelj, Physical Review Letters (2020), 124, 037801, describe a compound of formula B with similar behaviour between about 120° C. to 133° C.

B

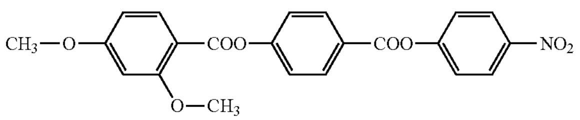

Further comparison of the two only available substances for $N_f$-LC phases is presented by Xi Chen et al., PNAS (Jun. 23, 2020), 117 (25) 14021-14031. The high significance of the advent of the new $N_f$-LC phase underlines O. D. Lavrentovich, Proc Nat Acad Sci USA (2020), 117(26), 14629-14631.

Very high values of the dielectric susceptibility of these substances and some structural variations thereof is reported in the publication Li et al., Sci. Adv. 2021, 7.

A new ferroelectric nematic substance of formula C is published by Atsutaka Manabe, Matthias Bremer, Martin Kraska (2021): Ferroelectric phase at and below room temperature, *Liquid Crystals,* 48, 1079-1086 (DOI 10.1080/02678292.2021.1921867), which is described to have a ferroelectric nematic liquid crystalline phase ($N_f$-LC phase) close to ambient temperature. Ambient temperature, also sometimes called room temperature, means in a narrower sense a temperature of 20° C. here.

C

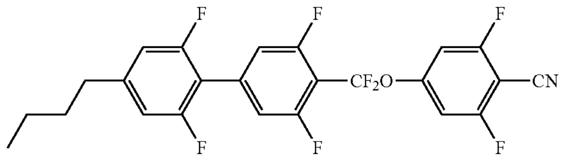

Exploitation of the $N_f$-LC phase for technical applications would clearly benefit from applicability to ambient temperatures. Technical devices and electronic applications are usually designed to have a working range above and below ambient temperature, respectively room temperature, e.g. from 15° C. to 25° C., preferably from 0° to 50° C. and more preferably even broader.

A ferroelectric nematic display is proposed in DE19629551 A1, however it does not disclose any specific materials at all, that can fulfil the requested ferroelectric nematic properties.

The use of fluorinated liquid crystal substances is known to the person skilled in the art. Various compounds containing two 2,6-difluorinated 1,4-phenylene rings have already been described as liquid-crystalline or mesogenic material, such as, for example, in the publication WO 2015/101405 A1 and various more. The compounds proposed therein usually do not contain three 2,6-difluorinated phenylene rings and a bridging group as (CO)O or $CF_2O$ in the same structural pattern, nor are they reported to have any ferroelectric properties. A compound containing two 2,6-difluorinated phenylene rings and a pyrimidine ring is disclosed in DE4409431 A1. Further pyrimidine ring and fluorinated phenylene containing compounds are disclosed in EP 2935513 A1 and WO 2017162707 A1.

An object of the present invention was finding novel stable compounds which are suitable as component(s) of ferroelectric nematic liquid crystal media ($N_f$-LC phase media). In particular, the compounds should simultaneously have a $N_f$-LC phase or support such phase in a $N_f$-LC medium. They should also have a moderate to high optical anisotropy for achieving the electrooptical switching effect as with conventional nematic LC media.

In view of the very wide variety of areas of application of compounds of this type having high dielectric anisotropy (Δε), it was desirable to have available further compounds, preferably having a high clearing point and low melting point, while showing a broad and suitable temperature range of the ferroelectric nematic phase.

It was thus a further object of the invention to find novel stable compounds which are suitable as component(s) of ferroelectric nematic liquid crystal media, in particular for displays analogous to conventional nematic TN, STN, IPS, FFS and TN-TFT displays.

In addition, it was an aim for the compounds to be thermally and photochemically stable under the conditions prevailing in the areas of application. As mesogens, they should facilitate a broad mesogenic phase, preferably a nematic phase, in particular at low temperatures, at least below room temperature.

Surprisingly, it has been found that a medium comprising several selected compounds as described below can achieve the ferroelectric phase in an highly advantageous temperature range, and specific new and conventional compounds in combination are eminently suitable as components of $N_f$-LC media. They can be used to obtain LC media with unprecedent properties, including, but not limited to liquid crystal media for displays which require particularly high or even extremely high dielectric anisotropies, in particular for IPS or FFS displays, but also for TN or STN displays, for electronic applications, capacitors and electro-mechanic devices making use of the high dielectric permittivity of the materials. The media and compounds used according to the invention are sufficiently stable and colourless. In particular, they are distinguished by extraordinarily high dielectric constants and in particular by very high dielectric anisotropies (Δε), owing to which much lower threshold voltages are necessary on use in optical switching elements. The compounds have reasonably good solubility for compounds having comparable properties and can be admixed with similar compounds almost unlimited. In addition, the compounds used according to the present invention have a high clearing point. These compounds also have relatively low melting points, or can be stably kept below their melting point as super-cooled melts. The invention enables the formation of the desired $N_f$-LC phase already at room temperature and below.

The high dielectric permeability will enable outstanding physical performance. The high (relative) dielectric permittivity is also especially advantageous for dielectrics in capacitors, since it causes high capacitance on a specific electrode area. In addition, the media have very low electric conductivity and are unique over conventional high-$\varepsilon_r$ materials (e.g. barium titanates) due to their fluid nature.

The liquid crystal media can be used for displays based on the principle of the twisted cell, the guest-host effect, the effect of deformation of aligned phases DAP or ECB (electrically controlled birefringence), the IPS (in-plane switching) effect or the effect of dynamic scattering.

BRIEF DESCRIPTION OF THE DRAWINGS

FIG. 1 shows a graph representing the dielectric properties of Mixture Example 1 over a range of temperature of -40 to 110° C. The T/$\varepsilon_r$ graph measured at 10 Hz and a voltage of about 50 mV shows the values of the relative dielectric permittivity $\varepsilon_r$ upon cooling. Between about 5 and 55° C. the value of $\varepsilon_r$ has a maximum (plateau shape) with a sharp decline towards higher temperatures. The maximum permittivity value of $\varepsilon_r$ at about 52° C. is 42400.

The invention thus in one main aspect relates to liquid crystalline media comprising 15% by weight or more of one or more compounds of formula IA,

IA

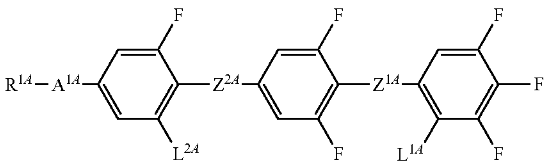

15% by weight or more of one or more of compounds of formula IB,

IB

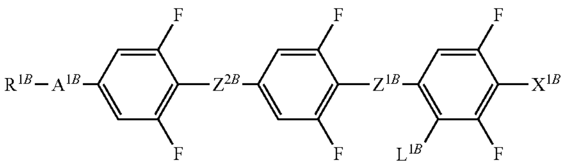

and 15%, preferably 20% by weight or more of one or more compounds selected from formula IC-1 to IC-3

IC-1

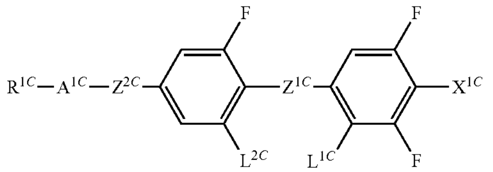

IC-2

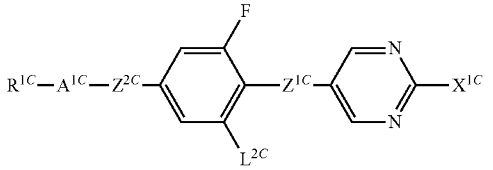

IC-3

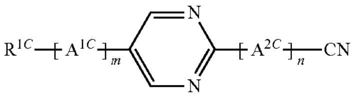

in which $X^{1B}$ denotes —CN or —NCS, preferably —CN, $X^{1C}$ denotes —CN, F, $CF_3$, —$OCF_3$, —NCS, $SF_5$ or O—CF═$CF_2$, preferably —CN or F, most preferably CN, $Z^{1A}$ and $Z^{1B}$ independently of one another denote —(CO)—O— or —$CF_2$—O— or a single bond, preferably —(CO)—O— or —$CF_2$—O—, $Z^{2A}$ and $Z^{2B}$ independently of one another denote a single bond, —(CO)—O— or —$CF_2$—O—, preferably a single bond, $Z^{1C}$ and $Z^{2C}$ one of the both groups denotes —(CO)—O— or —$CF_2$—O— and the other a single bond, preferably $Z^{1C}$ is —(CO)—O— or —$CF_2$—O— and $Z^{2C}$ is a single bond, $L^{1A}$, $L^{1B}$ and $L^{1C}$ independently of each other denote H or $CH_3$, preferably H, $L^{2A}$ is F or H, preferably F, $L^{2C}$ is F or H, preferably F, $A^{1A}$ denotes
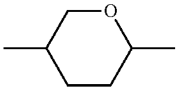, 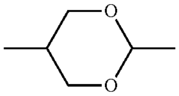, 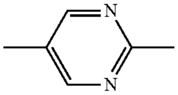,  or 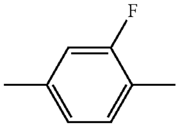
preferably
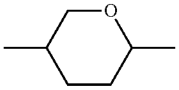, 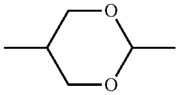 or 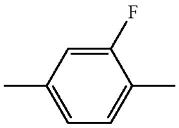,
most preferably
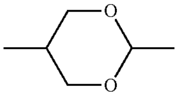 or 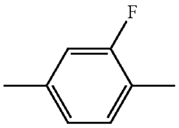,
$A^{1B}$ denotes
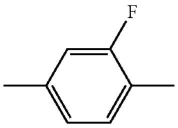, , 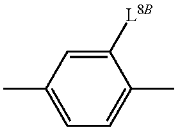, 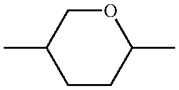, 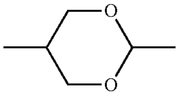, 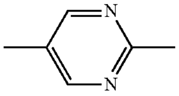,
preferably
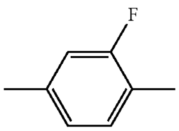,
wherein $L^{8B}$ denotes alkyl, alkoxy or alkoxyalkyl, each with 1 to 7 C atoms, preferably $CH_3$, $OCH_3$, $OCH_2CH_3$, $CH_2OCH_3$, $CH_2OCH_2CH_3$, $CH_2CH_2OCH_3$, $CH_2CH_2OCH_2CH_3$ or $CH_2CH_2CH_2OCH_3$,
$A^{1C}$ independently denotes
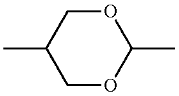, 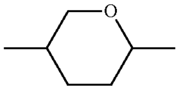, 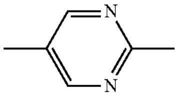, 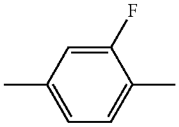 or 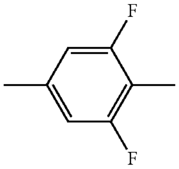,
preferably
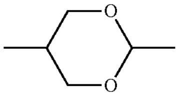, 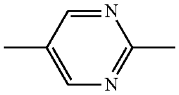, 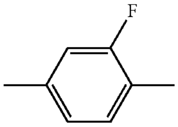 or 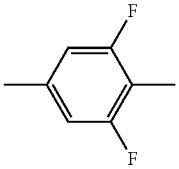,
most preferably
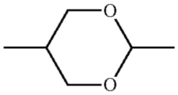, 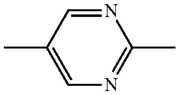 or 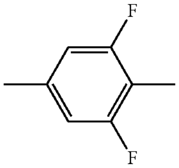,
$A^2C$ denotes
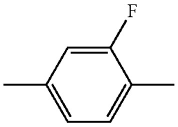 or 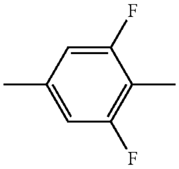, preferably

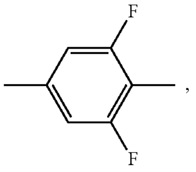

m, n 0, 1 or 2, where (m+n) is 2, $R^{1A}$, $R^{1B}$ and $R^{1C}$ independently of each another denote an alkyl radical having 1 to 12 C atoms, preferably 1 to 8, more preferably 1 to 6 and most preferably 1 to 5 C atoms, where, in addition, one or more $CH_2$ groups in these radicals may in each case be replaced, independently of one another, by —C≡C—, —$CF_2$—O—, —$OCF_2$—, —CH═CH—,

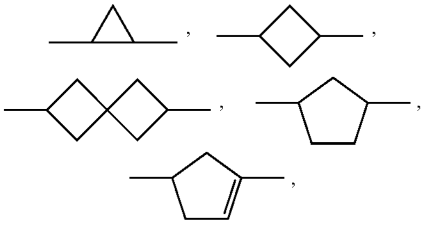

—O—, —S—, —(CO)—O— or —O—(CO)— in such a way that O/S atoms are not linked directly to one another, and in which, in addition, one or more H atoms may be replaced by halogen, or denotes H, preferably $R^{1A}$, $R^{1B}$ and $R^{1C}$ independently are a halogenated or unsubstituted alkyl radical having 1 to 10 C atoms, where, in addition, one or more $CH_2$ groups in these radicals may be replaced by —O— or —CH═CH— in such a way that O atoms are not linked directly.

The percentages are provided under the circumstance that the whole medium makes up 100% by weight of the medium.

The radicals $R^{1A}$, $R^{1B}$ and $R^{1C}$ in the respective formulae IA, IB and IC-1 to IC-3 and their respective sub-formulae preferably denote alkyl having 1 to 8 carbon atoms, alkoxy having 1 to 8 carbon atoms or alkenyl having 2 to 8 carbon atoms. These alkyl chains are preferably linear or they, preferably in case of $R^{1C}$, are branched by a single methyl or ethyl substituent, preferably in 2- or 3-position. $R^{1A}$, $R^{1B}$ and $R^{1C}$ particularly preferably denote a straight-chain alkyl radical having 1 to 7 C atoms or an unbranched alkenyl radical having 2 to 8 C atoms, in particular unbranched alkyl having 1 to 5 C atoms.

Alternative preferred radicals $R^{1A}$, $R^{1B}$ and $R^{1C}$ are selected from cyclopentyl, 2-fluoroethyl, cyclopropylmethyl, cyclopentylmethyl, cyclopentylmethoxy, cyclobutylmethyl, 2-methylcyclopropyl, 2-methylcyclobutyl, 2-methylbutyl, 2-ethylpentyl and 2-alkyloxyethoxy.

Compounds of the formula IA, IB and $IC_1$ to IC-3 containing branched or substituted end groups $R^{1A}$, $R^{1B}$ and $R^{1C}$, respectively, may occasionally be of importance owing to better solubility in the liquid-crystalline base materials. The groups $R^{1A}$, $R^{1B}$ and $R^{1C}$, respectively, are preferably straight chain.

The radicals $R^{1A}$, $R^{1B}$ and $R^{1C}$, respectively, particularly preferably selected from the moieties:

$CH_3$
$C_2H_5$
n-$C_3H_7$
n-$C_4H_9$
n-$C_5H_{11}$
$C_2H_5CH(CH_3)CH_2$
n-$C_6H_{13}$
n-$C_7H_{15}$
n-$C_3H_7CH(C_2H_5)CH_2$
n-$CH_{17}$
c-$C_3H_5$
c-$C_3H_5CH_2$
c-$C_4H_7$
c-$C_5H_7$
c-$C_5H_9$
c-$C_5H_9CH_2$
$CH_2$═CH
$CH_3$CH═CH
$CH_2$═$CH(CH_2)_2$
$CH_{30}$
$C_2H_{50}$
n-$C_3H_{70}$
n-$C_4H_{90}$
n-$C_5H_{110}$
$CH_{30}CH_2$
$C_2H_{50}CH_2$
$CH_{30}CH_2CH_2$
$C_2H_{50}CH_2CH_2$ wherein the following abbreviations for the end groups are used:

c-$C_3H_5$
c-$C_3H_5CH_2$
c-$C_4H_7$
c-$C_5H_7$
c-$C_5H_9$
and
c-$C_5H_9CH_2$

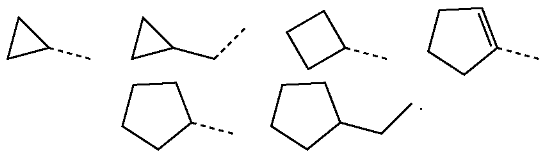

A further embodiment of the invention is directed to a ferroelectric nematic liquid crystalline medium comprising one or more compounds selected from formulae IA, IB, IC-1, IC-2 and IC-3 as defined above.

A further embodiment of the invention is directed to a ferroelectric nematic liquid crystalline medium comprising one or more compounds of formula IC-3 as defined above, preferably in the percentages and preferred formulae as provided throughout this disclosure.

In a preferred embodiment, the media according to the present invention preferably comprise one, two, three or more compounds of formula IA-1

IA-1

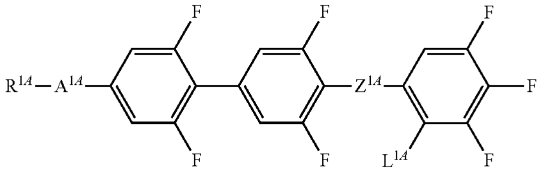

preferably selected from the group of formulae IA-1 to IA-3, preferably of formula IA-1:

IA-1-1

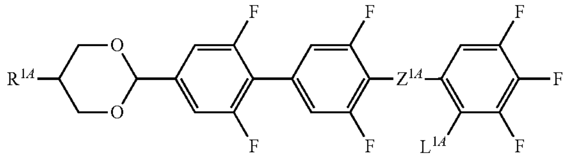

IA-1-2

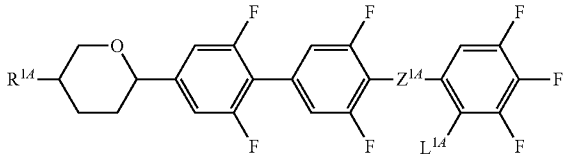

IA-1-3

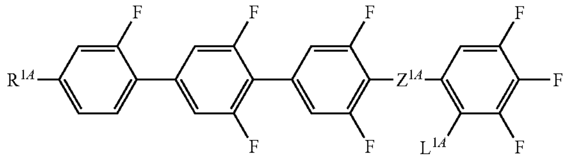

in which the parameters have the respective meanings given above and preferably $Z^{1A}$ denotes —$CF_2$—O—.

In a preferred embodiment, the media according to the present invention preferably comprise one, two, three or more compounds of formula IB-1 and/or IB-2, preferably of formula IB-1,

IB-1

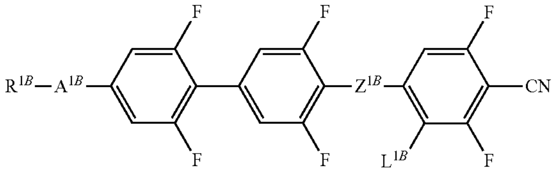

IB-2

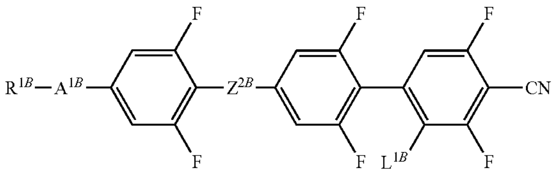

$R^{1B}$ denotes an alkyl radical having 1 to 12 C atoms, preferably 1 to 7, more preferably 1 to 6 and most preferably 1 to 5 C atoms, where, in addition, one or more $CH_2$ groups in these radicals may in each case be replaced, independently of one another, by —C≡C—, —$CF_2$—O—, —$OCF_2$—, —CH═CH—,

, 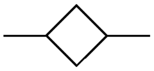,

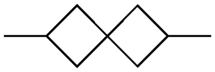, 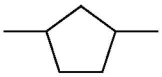,

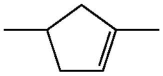,

—O—, —S—, —CO—O— or —O—CO— in such a way that O/S atoms are not linked directly to one another, and in which, in addition, one or more H atoms may be replaced by halogen, or denotes H, preferably $R^{1B}$ is a halogenated or unsubstituted alkyl radical having 1 to 12 C atoms, where, in addition, one or more $CH_2$ groups in these radicals may in each case be replaced, independently of one another, by —C≡C— or —CH═CH—, $A^{1B}$ denotes

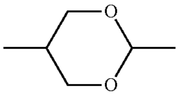, 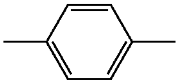,

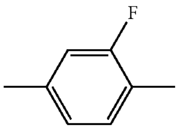 or 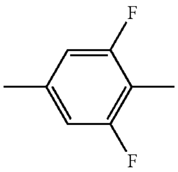

preferably

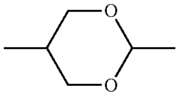 or 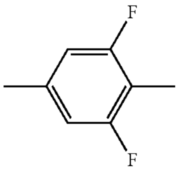, and $Z^{1B}$, $Z^{2B}$ independently denote —(CO)—O— or —$CF_2$—O—, preferably selected from the group of the following formulae, formulae IB-1-1 to IB-2-3:

IB-1-1

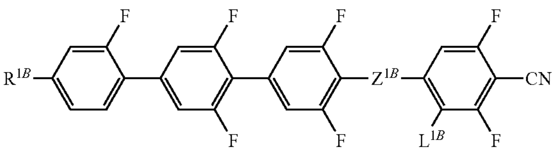

-continued

IB-1-2

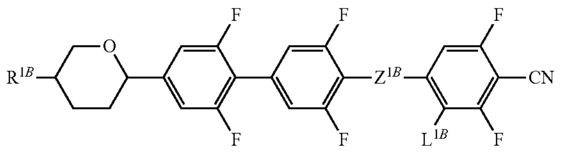

IB-1-3

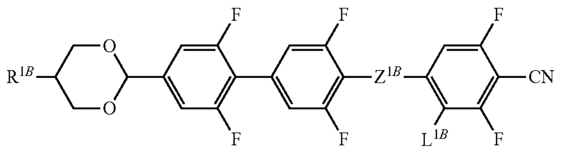

IB-2-1

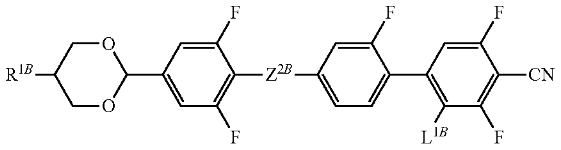

IB-2-2

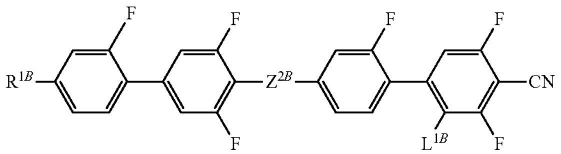

IB-2-3

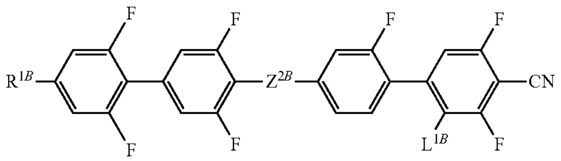

in which the parameters have the respective meanings given above and, in particular, in formula IB-1-1 to IB-1-3, $Z^{1B}$ preferably denotes —$CF_2$—O— and, in particular, in formula IB-2-1 and IB-2-2, $Z^{2B}$ denotes preferably —$CF_2$—O—;

and, in particular, in formula IB-2-3, $Z^{2B}$ denotes preferably —C(O)O—.

In a preferred embodiment, the media according to the present invention preferably comprise one, two, three or more compounds selected of formulae IC-1-1 to IC-3-5:

IC-1-1

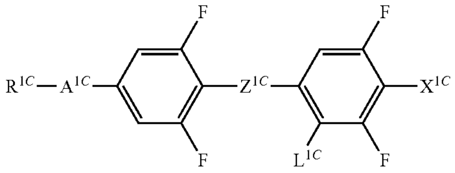

IC-1-2

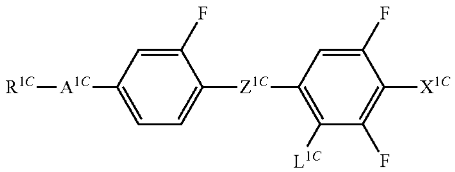

-continued

IC-1-3

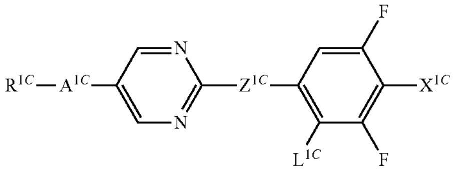

IC-2-1

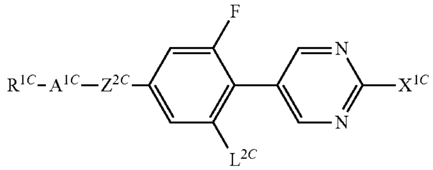

IC-3-1

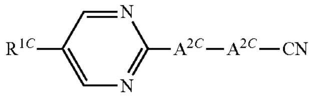

IC-3-2

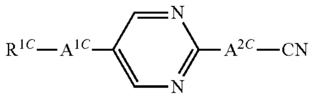

IC-3-3

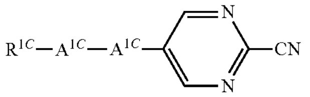

IC-3-4

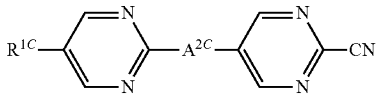

IC-3-5

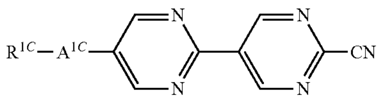

wherein $A^{1C}$ is defined as above, preferably selected from the group of formulae IC-1-1-1 to IC-3-5-2 preferably selected from the group of formulae IC-1-1-1, IC-1-1-2, IC-1-1-3, IC-1-1-4, IC-3-1-1 and IC-3-2-1:

IC-1-1-1

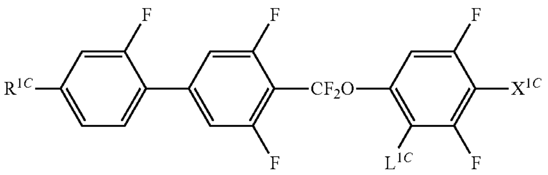

IC-1-1-2

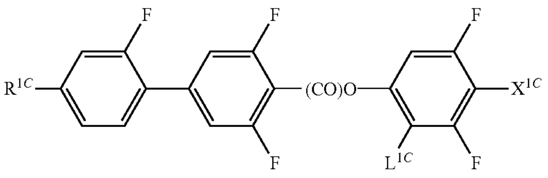

-continued
IC-1-1-3
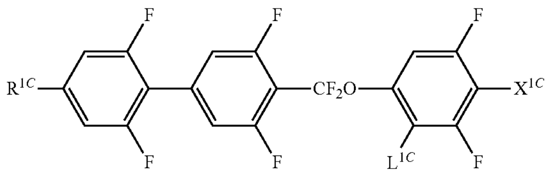
IC-1-1-4
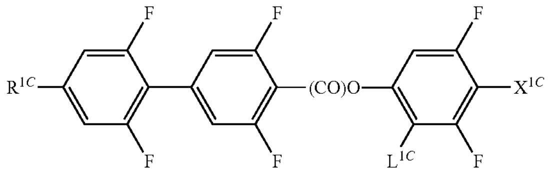
IC-1-1-5
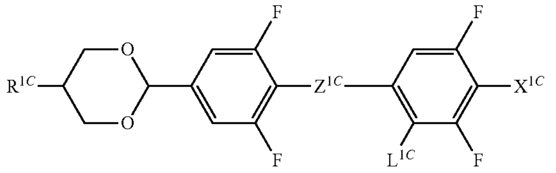
IC-1-1-6
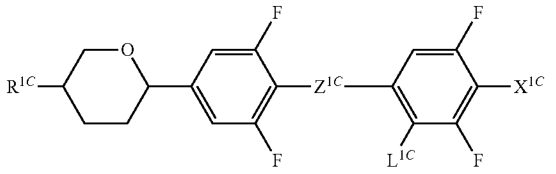
IC-1-2-1
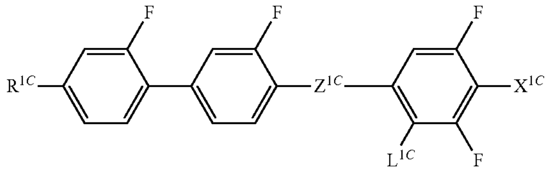
IC-1-2-2
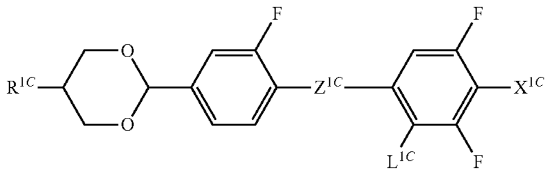
IC-1-1-7
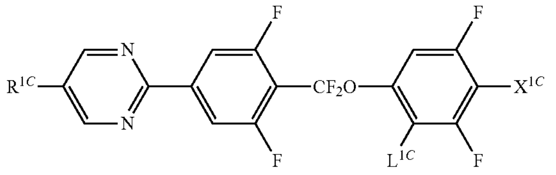
IC-1-1-8
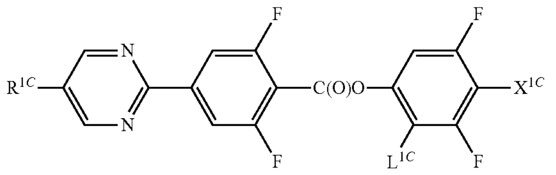
-continued
IC-3-1-1
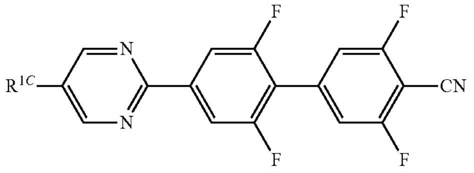
IC-3-2-1
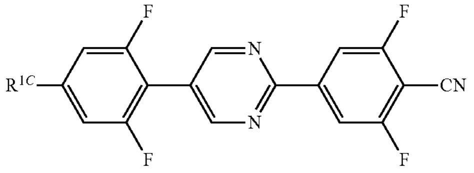
IC-3-3-1
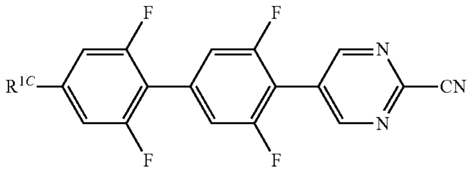
IC-3-3-2
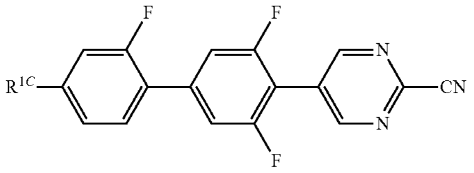
IC-3-4-1
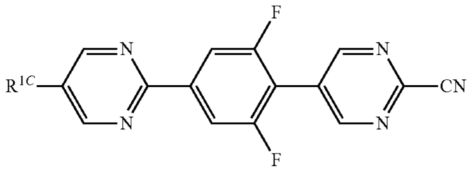
IC-3-4-2
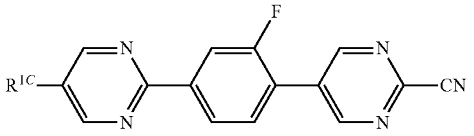
IC-3-5-1
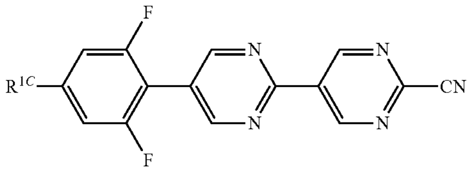
IC-3-5-2
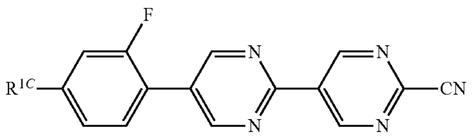
in which the parameters have the respective meanings given above and preferably
$L^{1C}$ denotes H,
$Z^{1C}$ denotes —$CF_2$—O— or —(CO)—O—, and
$X^{1C}$ denotes —CN or F, preferably —CN.
Particularly preferred compounds of the formula IC-1-1 to IC-1-4 used in the media are the compounds of the formulae below:

IC-1-1-1-1

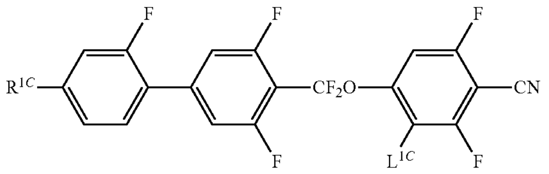

IC-1-1-2-1

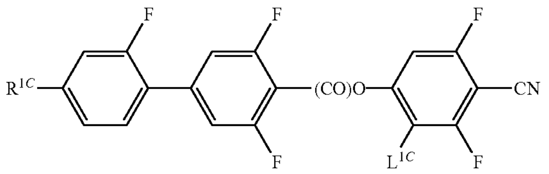

IC-1-1-3-1

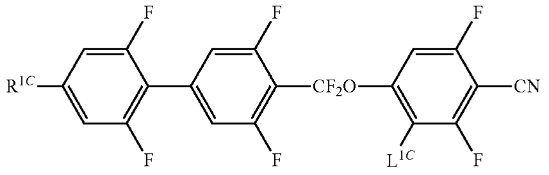

IC-1-1-4-1

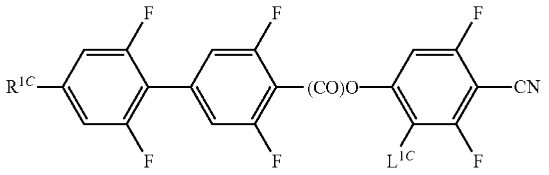

wherein the parameters are defined as above, preferably $L^{1C}$ is H.

In a preferred embodiment of the present invention the media comprise up to 100% of one or more compounds, preferably of three, four, five, six or more, compounds selected from group 1 of compounds, the group of compounds of formulae IA, IB and IC-1/-2/-3. In this embodiment the media preferably predominantly consist of, more preferably they essentially consist of, and most preferably, they virtually completely consist of these compounds.

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "virtually completely consist of": the concentration of the constituents in question in the composition is preferably 98% or more, particularly preferably 99% or more and very particularly preferably 100.0%.

Preferably the media according to the present application fulfil one or more of the following conditions. They preferably comprise:

20% or more of compounds of formula IA, more preferably 25%, more preferably 27% or more and most preferably 32% by weight or more of compounds of formula IA, 17% or more of compounds of formula IB, more preferably 20% or more, more preferably 22% or more and most preferably 25% by weight or more of compounds of formula IB, 40% or more of compounds selected from formula IA and IB, more preferably 45%, more preferably 50% or more and most preferably 55% by weight or more of compounds selected from formula IA and IB, i.e. the sum of compounds of formula IA and IB preferably is at least of the above values, 20% or more, preferably 25% or more of compounds selected of formula IC-1, IC-2 and IC-3, more preferably 28%, more preferably 32% or more and most preferably 34% by weight or more, optionally 2% or more of compounds of formula ID (ID-1, ID-2, ID-3, ID-4), more preferably 5%, more preferably 10% or more and most preferably 15% by weight or more of compounds of formula ID, one, two, three or more, preferably three or more, compounds of the formula IA-1-1, preferably of formula DUUQU-n-F, most preferably selected from the group of the compounds DUUQU-2-F, DUUQU-3-F, DUUQU-4-F and DUUQU-5-F and DUUQU-6-F, one, two, three or more, preferably three or more, compounds of the formula IB-1, preferably of formulae GUUQU-n-N and/or DUUQU-n-N, most preferably selected from the group of the compounds GUUQU-2-N, GUUQU-3-N, GUUQU-4-N, GUUQU-5-N, GUUQU-6-N, GUUQU-7-N, DUUQU-2-N, DUUQU-3-N, DUUQU-4-N, DUUQU-5-N and DUUQU-6-N, one, two, three or more compounds of the formula IA-1-3, preferably of formula GUUQU-n-F, more preferred selected from the group of the compounds GUUQU-3-F, GUUQU-4-F and GUUQU-5-F, one, two, three or more compounds of the formula IB-1-3, preferably of formula DUUQU-n-N, more preferred selected from the group of the compounds DUUQU-3-N, DUUQU-4-N and DUUQU-5-N, one, two, three or more compounds of the formula IC-1-1, preferably of formula MUZU-n-N or MUQU-n-N, more preferred selected from the group of the compounds MUZU-2-N, MUZU-3-N, MUZU-4-N and MUZU-5-N, one, two, three or more compounds of the formula IC-3, preferably selected from the formulae MUU-n-N or UMU-n-N, more preferably selected from the group of the compounds MUU-3-N, MUU-4-N, MUU-5-F, UMU-3-N, UMU-4-N and UMU-5-N, one, two, three or more compounds of the formula IC-1-1, preferably selected from the formulae GUZU-n-N or GUQU-n-N, more preferably selected from the group of the compounds GUZU-3-N, GUZU-4-N, GUZU-5-F, GUQU-3-N, GUQU-4-N and GUQU-5-N, and/or one, two, three or more compounds of the group of formulae IC-1-1-3 and IC-1-1-4, preferably of formulae UUZU-n-N and/or UUQU-n-N, most preferably selected from the group of the compounds UUZU-2-N, UUZU-3-N, UUZU-4-N, UUZU-5-N, UUQU-2-N, UUQU-3-N and UUQU-4-N, wherein n is 1, 2, 3, 4, 5, 6 or 7.

In another preferred embodiment of the present invention said compounds of formulae IA, IB and IC-1/-2/-3 are a first group of compounds, group 1, of compounds. In this embodiment the concentration of the compounds of this group 1 of compounds preferably is in the range from 70% or more, preferably 80% or more, more preferably 90% or more to 100% or less.

In addition to the compounds of formulae IA, IB and IC-1/-2/-3 the media according to the invention optionally, preferably obligatory, comprise one, two, three or more compounds selected from formula ID-1 to ID-4

ID-1

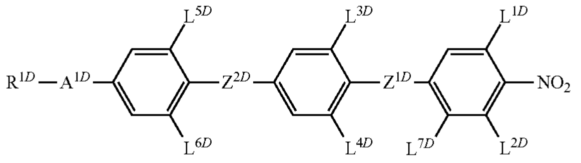

ID-2

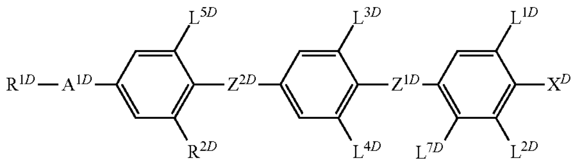

ID-3

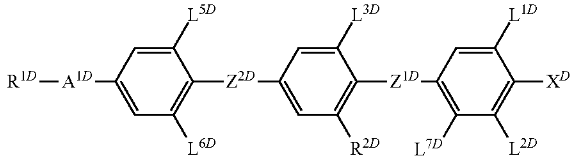

ID-4

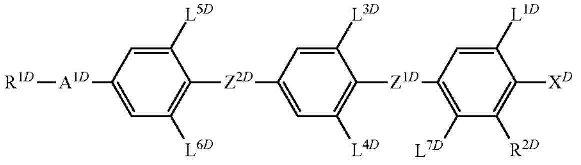

$X^D$ denotes CN, F, $CF_3$, $-OCF_3$, NCS, $SF_5$ or $O-CF{=}CF_2$, preferably $-CN$, F, $-CF_3$, $-OCF_3$, $-Cl$ or $-NCS$, most preferably F or CN, $L^{1D}$, $L^{2D}$, $L^{3D}$, $L^{4D}$, $L^{5D}$, $L^{6D}$ and $L^{7D}$, independently denote F, H, alkyl, alkoxy or alkoxyalkyl, each with 1 to 7 C atoms, preferably H, F, $CH_3$, $OCH_3$, $OCH_2CH_3$, $CH_2OCH_3$, $CH_2OCH_2CH_3$, $CH_2CH_2OCH_3$, $CH_2CH_2OCH_2CH_3$ or $CH_2CH_2CH_2OCH_3$, $Z^{1D}$ and $Z^{2D}$ independently of one another denote $-(CO)-C-$, $-CF_2-O-$, a single bond, and preferably both $-(CO)-C-$, $R^{1D}$ denotes an alkyl radical having 1 to 12 C atoms, preferably 1 to 7, more preferably 1 to 6 and most preferably 1 to 5 C atoms, where, in addition, one or more $CH_2$ groups in these radicals may in each case be replaced, independently of one another, by $-C{\equiv}C-$, $-CF_2-O-$, $-OCF_2-$, $-CH{=}CH-$,

,
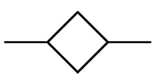
,

-continued

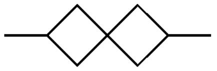
,
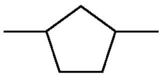
,
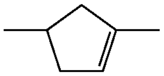
, $-O-$, $-S-$, $-(CO)-O-$ or $-O-(CO)-$ in such a way that O/S atoms are not linked directly to one another, and in which, in addition, one or more H atoms may be replaced by halogen, or denotes H, preferably $R^{1D}$ is a halogenated or unsubstituted alkyl radical having 1 to 12 C atoms, where, in addition, one or more $CH_2$ groups in these radicals may in each case be replaced, independently of one another, by $-C{\equiv}C-$ or $-CH{=}CH-$, $R^{2D}$ denotes alkyl, alkoxy or alkoxyalkyl, each with 1 to 7 C atoms, preferably $CH_3$, $OCH_3$, $OCH_2CH_3$, $CH_2OCH_3$, $CH_2OCH_2CH_3$, $CH_2CH_2OCH_3$, $CH_2CH_2OCH_2CH_3$ or $CH_2CH_2CH_2OCH_3$, $A^{1D}$ denotes a single bond,

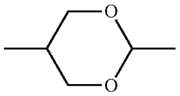
,
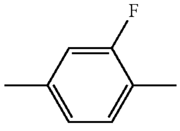
,
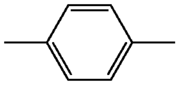
,
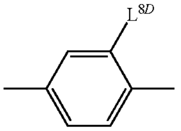
,
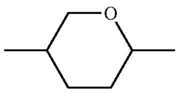
or
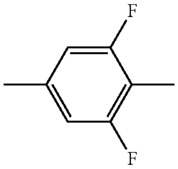

preferably a single bond,

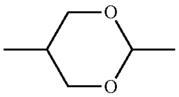
or
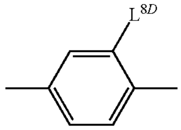
, wherein $L^{8D}$ denotes alkyl, alkoxy or alkoxyalkyl, each with 1 to 7 C atoms, preferably $CH_3$, $OCH_3$, $OCH_2CH_3$, $CH_2OCH_3$, $CH_2OCH_2CH_3$, $CH_2CH_2OCH_3$, $CH_2CH_2OCH_2CH_3$ or $CH_2CH_2CH_2OCH_3$, preferably it comprises one or more of formulae ID-1-1 to ID-3-1:

ID-1-1

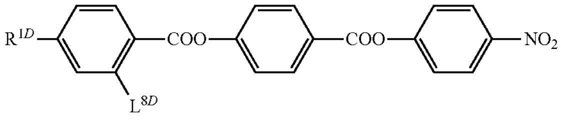

-continued

ID-1-2

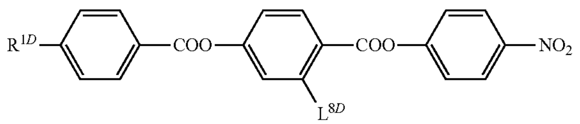

ID-1-3

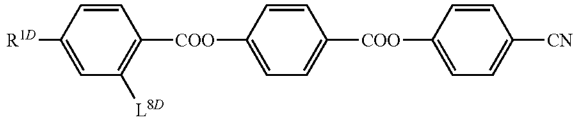

ID-3-1

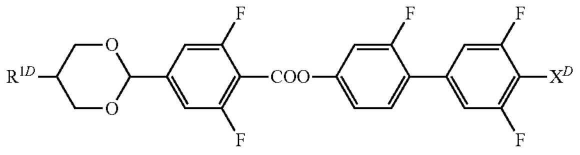

wherein the variable groups $R^{1D}$ and $L^{8D}$ are defined as above.

The media optionally comprise additionally one or more compounds selected from the following groups of compounds:

The media comprise optionally, preferably obligatorily, either alternatively or additionally to further compounds besides those of formulae IA, IB and IC-1/IC-2/IC-3, i.e. of the group 1 of compounds, one or more compounds, selected from the group of compounds of formulae II and III (group 2), preferably in a concentration from more than 0% to 50% or less,

II

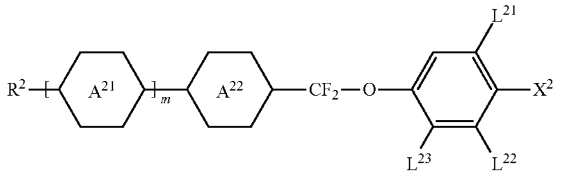

III

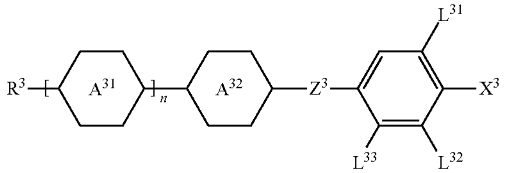

wherein $R^2$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

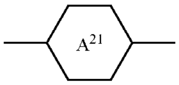 and 

on each appearance, independently of one another, denote

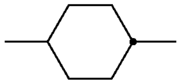, 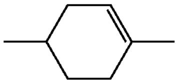, 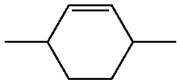, 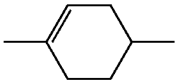, 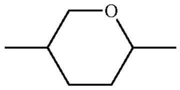, 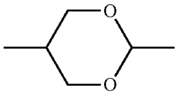, 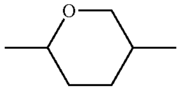, 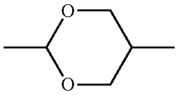, 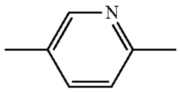, 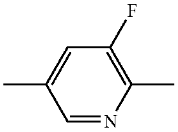, 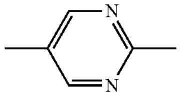, 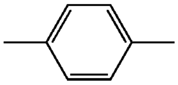, 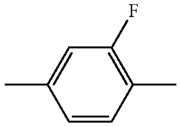, 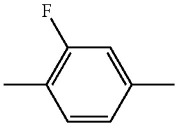, 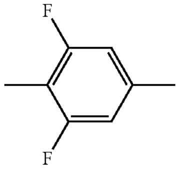 or 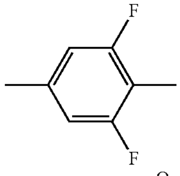, preferably

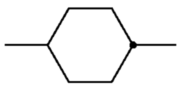, 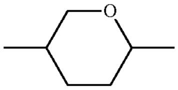, 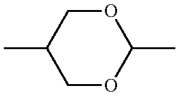, 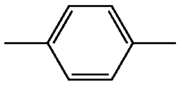, 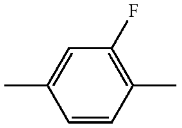, 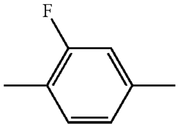, or 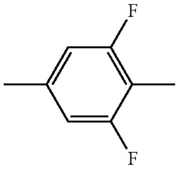, $L^{21}$ and $L^{22}$ denote H or F, preferably $L^{21}$ denotes F, $L^{32}$ and $L^{33}$ denote H, F or $CH_3$, preferably H, $X^2$ denotes halogen, halogenated alkyl or alkoxy having 1 to 3 C atoms or halogenated alkenyl or alkenyloxy having 2 or 3 C atoms, preferably F, Cl, $-OCF_3$, $-O-CH_2CF_3$, $-O-CH=CH_2$, $-O-CH=CF_2$ or $-CF_3$, very preferably F, Cl, $-O-CH=CF_2$ or $-OCF_3$, m denotes 0, 1, 2 or 3, preferably 1 or 2 and particularly preferably 2, $R^3$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably n-alkyl, cyclopropyl, cyclopentyl or alkenyl,

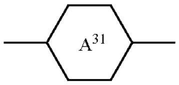 and 

on each appearance, independently of one another, are

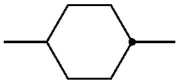, 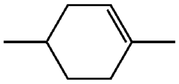, 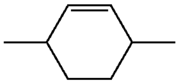, 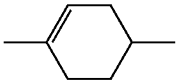, 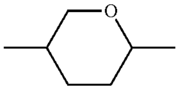, 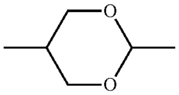, 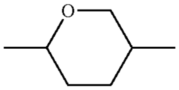, 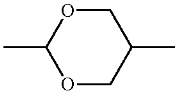, 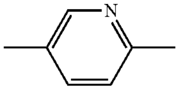, 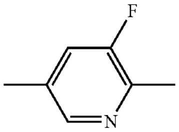, 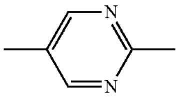, 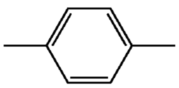, 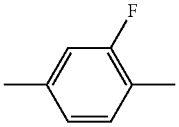, 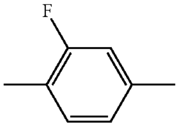, 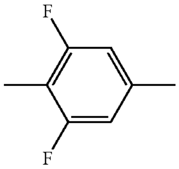 or 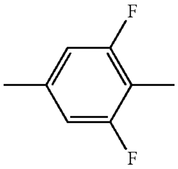, preferably 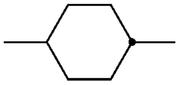, 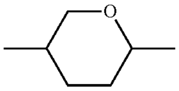, 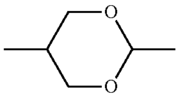, 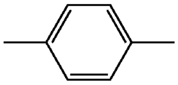, 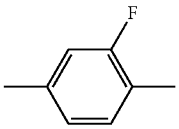, 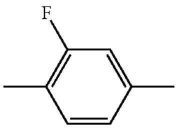, or 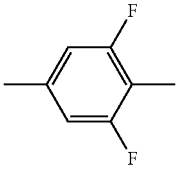, $L^{31}$ and $L^{32}$, independently of one another, denote H or F, preferably $L^{31}$ denotes F, $X^3$ denotes halogen, halogenated alkyl or alkoxy having 1 to 3 C atoms or halogenated alkenyl or alkenyloxy having 2 or 3 C atoms, F, Cl, $—OCF_3$, $—OCHF_2$, $—O—CH_2CF_3$, $—O—CH{=}CF_2$, $—O—CH{=}CH_2$ or $—CF_3$, very preferably F, Cl, $—O—CH{=}CF_2$, $—OCHF_2$ or $—OCF_3$, $Z^3$ denotes $—CH_2CH_2—$, $—CF_2CF_2—$, —COO-trans-CH═CH—, trans-CF═CF— $—CH_2O—$ or a single bond, preferably $—CH_2CH_2—$, —COO-trans-CH═CH— or a single bond and very preferably —(CO)—O—, trans-CH═CH— or a single bond, and n denotes 0, 1, 2 or 3, preferably 1, 2 or 3 and particularly preferably 1, wherein the respective rings, and preferably the phenylene rings, optionally may each be substituted by one or two alkyl groups, preferably by methyl and/or ethyl groups, preferably by one methyl group, and, wherein the compounds of formulae IA, IB, IC-1/-2/-3 and ID are excluded from the compounds of formula II, again optionally, either alternatively or additionally, one or more compounds, selected from the group of compounds of formulae IV and V (group 3), preferably in a concentration from more than 0% to 15%,

IV

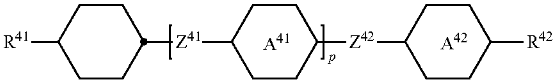

V

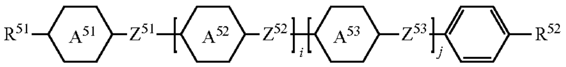

wherein $R^{41}$ and $R^{42}$, independently of one another, have the meaning indicated above for $R^2$ under formula II, preferably $R^{41}$ denotes alkyl and $R^{42}$ denotes alkyl or alkoxy or $R^{41}$ denotes alkenyl and $R^{42}$ denotes alkyl,

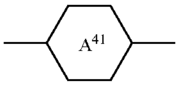 and 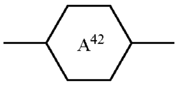

independently of one another and, if

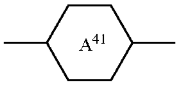

occurs twice, also these independently of one another, denote

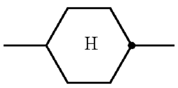, 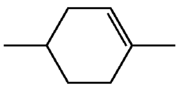, 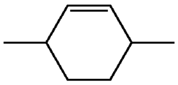, 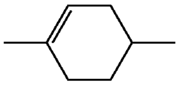,

-continued

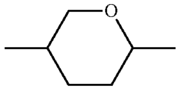, 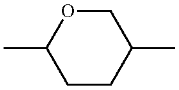, 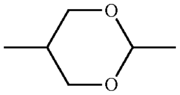, 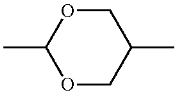, 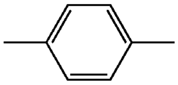, 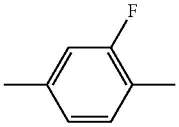, 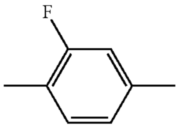, 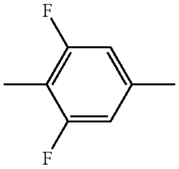, 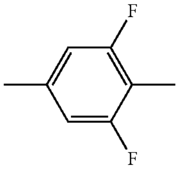, 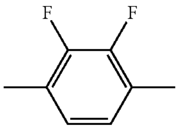, 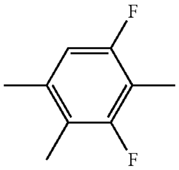 or 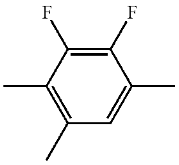, preferably one or more of

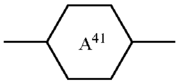 and 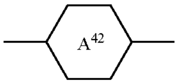

denotes or denote,

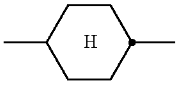

$Z^{41}$ and $Z^{42}$, independently of one another and, if $Z^{41}$ occurs twice, also these independently of one another, denote $-CH_2CH_2-$, $-COO-$, trans $-CH{=}CH-$, trans $-CF{=}CF-$, $-CH_2O-$, $-CF_2-O-$, $-C{\equiv}C-$ or a single bond, preferably one or more thereof denotes/denote a single bond, and p denotes 0, 1 or 2, preferably 0 or 1, and $R^{51}$ and $R^{52}$, independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

 to , if present, each, independently of one another, denote

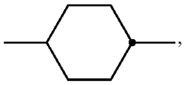, 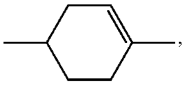, 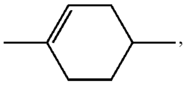, 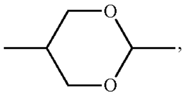, 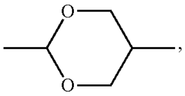, 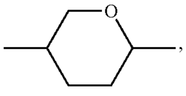, 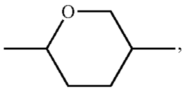, 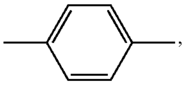, 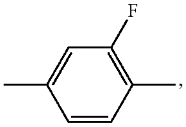, 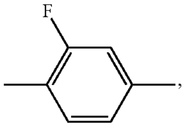, 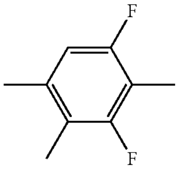 or 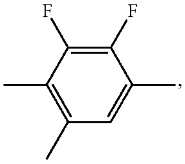, preferably

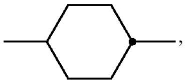, 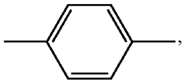, 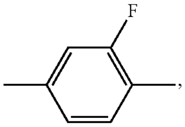, or 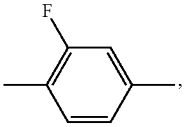, preferably

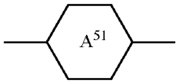

denotes

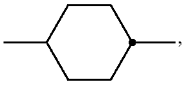, and, if present,

preferably denotes

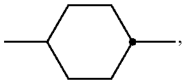

$Z^{51}$ to $Z^{53}$ each, independently of one another, denote $-CH_2-CH_2-$, $-CH_2-O-$, $-CH{=}CH-$, $-C{\equiv}C-$, $-COO-$ or a single bond, preferably $-CH_2-CH_2-$, $-CH_2-O-$ or a single bond and particularly preferably a single bond, i and j each, independently of one another, denote 0 or 1, (i+j) preferably denotes 0, 1 or 2, more preferably 0 or 1 and, most preferably 1, wherein the respective rings, and preferably the phenylene rings, optionally may each be substituted by one or two alkyl groups, preferably by methyl and/or ethyl groups, preferably by one methyl group, and again optionally, preferably obligatorily, either alternatively or additionally, one or more compounds, preferably two, three or more compounds, selected from the group 4 the group of compounds of formulae I and VI to IX, preferably in a concentration from more than 0% to 20%,

I

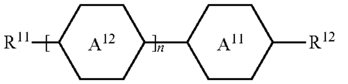

VI

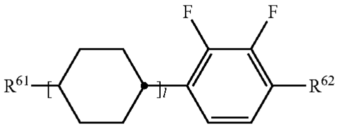

VII

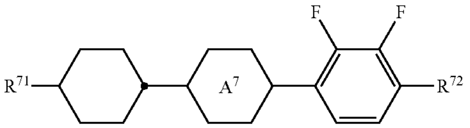

VIII

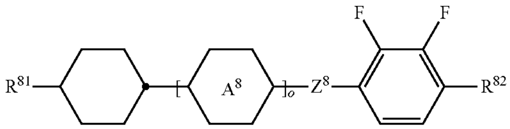

IX

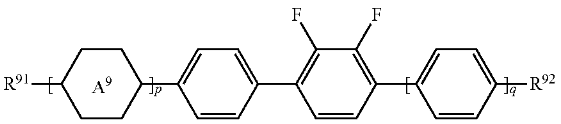

wherein

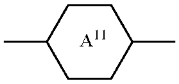

denotes

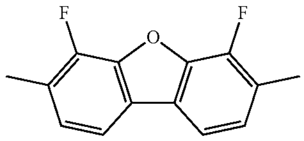,

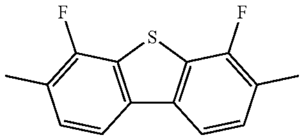,

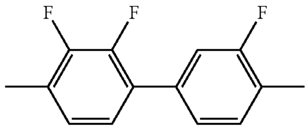,

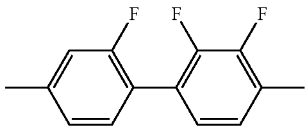,

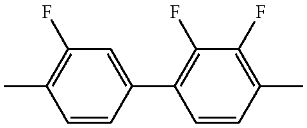,

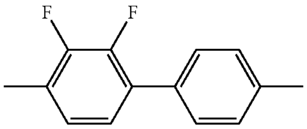,

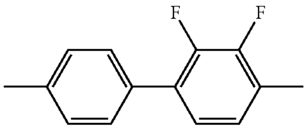,

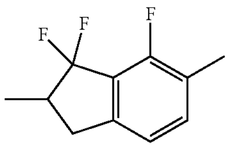 or 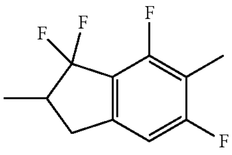

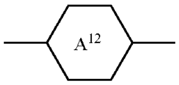

denotes

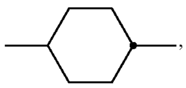, 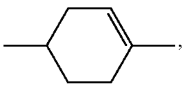, 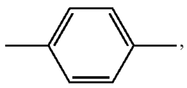,

-continued

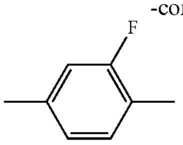 or 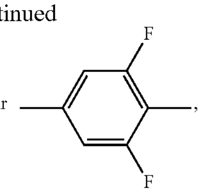, preferably

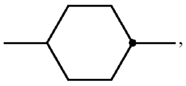, 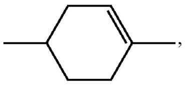,

 or 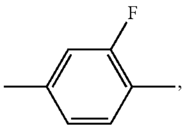, n denotes 0 or 1, $R^{11}$ and $R^{12}$ independently of each other denote alkyl, alkoxy, fluorinated alkyl or fluorinated alkoxy, preferably having 1 to 7 C atoms, wherein one $CH_2$ group may be replaced by a 1,2-cyclopropyl group, by a 1,3-cyclopentyl group or by a 1,3-cyclopentenylene group, alkenyl, alkenyloxy, alkoxyalkyl or fluorinated alkenyl having 2 to 7 C atoms and preferably alkyl, alkoxy, alkenyl or alkenyloxy, most preferably alkyl, alkoxy or alkenyloxy, $R^{61}$ denotes an unsubstituted alkyl radical having 1 to 7 C atoms, preferably a straight-chain alkyl radical, more preferably an n-alkyl radical, most preferably propyl or pentyl, an unsubstituted alkenyl radical having 2 to 7 C atoms, preferably a straight-chain alkenyl radical, particularly preferably having 2 to 5 C atoms, an unsubstituted alkoxy radical having 1 to 6 C atoms or an unsubstituted alkenyloxy radical having 2 to 6 C atoms, $R^{62}$ denotes an unsubstituted alkyl radical having 1 to 7 C atoms, an unsubstituted alkoxy radical having 1 to 6 C atoms or an unsubstituted alkenyloxy radical having 2 to 6 C atoms, and l denotes 0 or 1, $R^{71}$ denotes an unsubstituted alkyl radical having 1 to 7 C atoms, preferably a straight-chain alkyl radical, more preferably an n-alkyl radical, most preferably propyl or pentyl, or an unsubstituted alkenyl radical having 2 to 7 C atoms, preferably a straight-chain alkenyl radical, particularly preferably having 2 to 5 C atoms, $R^{72}$ denotes an unsubstituted alkyl radical having 1 to 7 C atoms, preferably having 2 to 5 C atoms, an unsubstituted alkoxy radical having 1 to 6 C atoms, preferably having 1, 2, 3 or 4 C atoms, or an unsubstituted alkenyloxy radical having 2 to 6 C atoms, preferably having 2, 3 or 4 C atoms, and

denotes

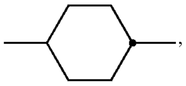, 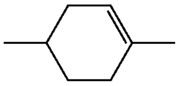 or

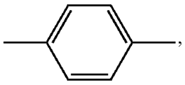, $R^{81}$ denotes an unsubstituted alkyl radical having 1 to 7 C atoms, preferably a straight-chain alkyl radical, more preferably an n-alkyl radical, most preferably propyl or pentyl, or an unsubstituted alkenyl radical having 2 to 7 C atoms, preferably a straight-chain alkenyl radical, particularly preferably having 2 to 5 C atoms, $R^{82}$ denotes an unsubstituted alkyl radical having 1 to 7 C atoms, preferably having 2 to 5 C atoms, an unsubstituted alkoxy radical having 1 to 6 C atoms, preferably having 1, 2, 3 or 4 C atoms, or an unsubstituted alkenyloxy radical having 2 to 6 C atoms, preferably having 2, 3 or 4 C atoms,

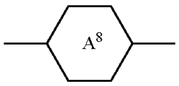

denotes

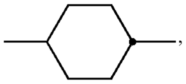, 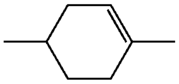 or

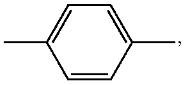, preferably

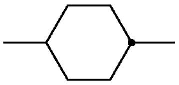 or 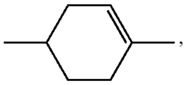, more preferably

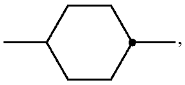, $Z^8$ denotes —(CO)—O—, —$CH_2$—O—, —$CF_2$—O— or —$CH_2$—$CH_2$—, preferably —(CO)—O— or —$CH_2$—O—, and o denotes 0 or 1, $R^{91}$ and $R^{92}$ independently of one another have the meaning given for $R^{72}$ above, $R^{91}$ preferably denotes an alkyl radical having 2 to 5 C atoms, preferably having 3 to 5 C atoms, $R^{92}$ preferably denotes an alkyl or alkoxy radical having 2 to 5 C atoms, more preferably an alkoxy radical having 2 to 4 C atoms, or an alkenyloxy radical having 2 to 4 C atoms.

denotes

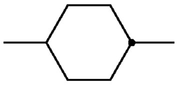 or 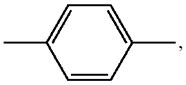, p and q independently of each other denote 0 or 1, and (p+q) preferably denotes 0 or 1, in case

denotes

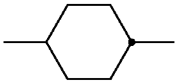 or 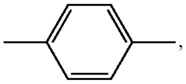, alternatively, preferably p=q=1, wherein the respective rings, and preferably the phenylene rings, optionally may each be substituted by one or two alkyl groups, preferably by methyl and/or ethyl groups, preferably by one methyl group, and wherein especially the rings

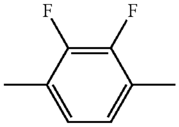

alternatively be replaced by

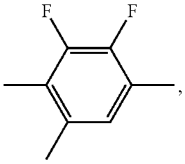, and wherein the compounds of formula VII are excluded from the compounds of formula IX, and the compounds of formula I are excluded from the compounds of formulae VI to IX, resp. formula IX, again optionally, preferably obligatorily, either alternatively or additionally, one or more compounds, preferably two, three or more compounds, selected from the group 5, the group of compounds of formula B, preferably in a concentration from more than 0% to 20%,

B

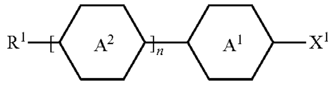

wherein

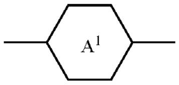

denotes

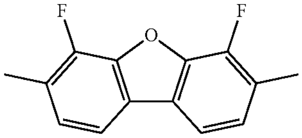 or

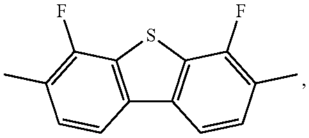, 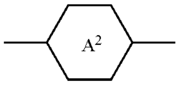

denotes, in each occurrence independently of one another,

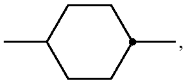, 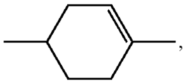, 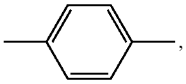,

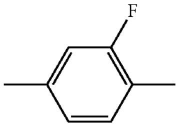 or 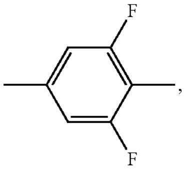, preferably

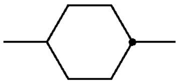 or 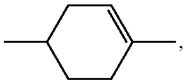, most preferably

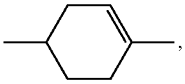, n denotes 0, 1 or 2, preferably 1, $R^1$ denotes an alkyl, radical having 1 to 7 C atoms, wherein one or more $CH_2$ groups, preferably one $CH_2$ group, in this radical may each be replaced, independently of one another, by —C≡C—, —$CF_2$—O—, —$OCF_2$—, —O—, —(CO)—O—, —O—(C=O)—, cyclo-propylene, 1,3-cyclobutylene, 1,3-cyclopentylene, 1,3-cyclopentenylene, preferably by cyclopropylene or 1,3-cyclopentylene, preferably one $CH_2$ group may be replaced by a 1,2-cyclopropylene group, by a 1,3-cyclopentylene group or by a 1,3-cyclopentenylene group, alkenyl, alkenyloxy, alkoxyalkyl or fluorinated alkenyl having 2 to 7 C atoms and preferably alkyl or alkenyl, wherein one —$CH_2$— group may be replaced by cyclo-propylene, 1,3-cyclobutylene, 1,3-cyclopentylene, 1,3-cyclo-pentenylene, preferably by cyclopropylene or 1,3-cyclopentenylene, in such a way that 0 atoms are not linked directly to one another, and in which one or more H atoms may be replaced by halogen, and $X^1$ denotes F, Cl, fluorinated alkyl, fluorinated alkenyl, fluorinated alkoxy or fluorinated, the latter four groups preferably having 1 to 4 C atoms, more preferably F, Cl, $CF_3$ or $OCF_3$, and wherein the respective rings, and preferably the phenylene rings, optionally may each be substituted by one or two alkyl groups, preferably by methyl and/or ethyl groups, preferably by one methyl group.

Preferred are media comprising one or more compounds of groups 1 and 2.

Corresponding starting materials can generally readily be prepared by the person skilled in the art by synthetic methods known from the literature or are commercially available. The reaction methods and reagents used are in principle known from the literature. Further reaction conditions are exemplified by the working examples. Further preferred process variants, not mentioned above, are revealed by the examples or the claims.

In the present disclosure, the 2,5-disubstituted dioxane ring of the formula

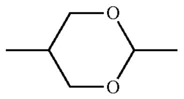

preferably denotes a 2,5-trans-configured dioxane ring, i.e., the substituents R are preferably both in the equatorial position in the preferred chair conformation. The 2,5-disubstituted tetrahydropyran of the formula

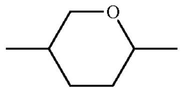

likewise preferably denotes a 2,5-trans-configured tetrahydropyran ring, i.e., the substituents are preferably both in the equatorial position in the preferred chair conformation.

The liquid crystalline medium according to the invention has a broad temperature range of the ferroelectric nematic phase. It exhibits the ferroelectric nematic phase ranges at 20° and above and below (ambient temperature). It covers the technically most interesting range from at least 10 to 50° C. and significantly beyond to lower and/or higher temperatures. So it is highly suitable for all kind of household or industry use, and with some limitations even outdoors. The medium exhibits a ferroelectric nematic phase at least over a temperature range of 20 Kelvin or more, more preferably over 30 K or more, and most preferably over a range of 40 K or more. The achievable combinations of temperature range of the ferroelectric nematic phase, clearing point, low-temperature stability (LTS), (relative) dielectric permittivity, dielectric anisotropy and optical anisotropy containing the compounds of formulae IA, IB and IC-1/-2/-3 are far superior to previous materials of such kind from the prior art. Previously only single compound materials were available with limited choice, which have a limited ferroelectric nematic phase range.

In addition, the mixtures according to the invention generally exhibit very broad nematic phase ranges having clearing points of 65° C. or more.

The liquid crystal media according to the invention preferably exhibit a temperature range of the ferroelectric nematic phase which is 20 degrees wide or more, preferably it extends over a range of 40 degrees or more, more preferably of 60 degrees or more.

Preferably the liquid crystal media according to the invention preferably exhibit the ferroelectric nematic phase from 10° C. to 30° C., more preferably from 10° C. to 40° C., more preferably from 10° C. to 50° C., more preferably from 0° C. to 50° C. and, most preferably, from −10° C. to 50° C.

In another preferred embodiment the liquid crystal media according to the invention preferably exhibit the ferroelectric nematic phase from 10° C. to 40° C., more preferably from 10° C. to 50° C., more preferably from 10° C. to 60° C. and, most preferably, from 10° C. to 70° C.

The liquid crystal media according to the invention exhibit outstanding dielectric properties.

Due to their outstanding properties the media can perform in many new areas of technology and may have use for electro-optical purposes, for supercapacitors, non-linear optic elements, sensors for electrical fields, memory devices and electro-mechanic devices, including electric generators (i. e. energy harvesting devices) and actuators. The materials may for example enable unconventional modes of energy harvesting from vibrational motion.

Preferably the media according to the invention have values of $\varepsilon_r$ of 700 or more, more preferably of 800 or more, more preferably 15000, even more preferably 30000 or more, and more preferably 35000 or more (at 20° C. and 10 Hz).

These dielectric properties are achieved at temperatures at which the media are in the ferroelectric nematic phase. The dielectric characteristics may show a hysteresis behaviour, particularly over varying temperature, and in that case the values obtained at a certain temperature may depend on the history of the material, i.e. whether the material is being heated up or cooled down.

This effect enables, amongst others, the operation of devices e.g. in bistable modes, which may be used beneficially in electro-optical devices, as e.g. known from ferroelectric smectic devices.

The liquid crystal media according to the invention preferably comprise 2 to 40, particularly preferably 4 to 20, compounds as further constituents besides one or more compounds according to the invention. In particular, these media may comprise 1 to 25 components besides one or more compounds according to the invention. These further constituents are preferably selected from ferroelectric nematic or nematogenic (monotropic or isotropic) substances, Prior art ferroelectric substances and similar compounds with high dielectric permittivity for combination with the current substances are selected from e.g. the following structures:

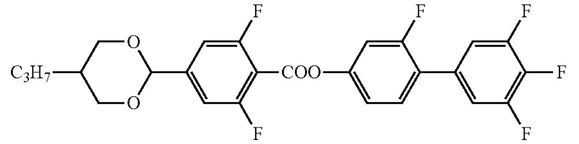

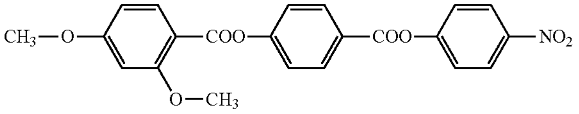

The media according to the invention preferably comprise 1% to 100%, more preferably 10% to 100% and, particularly preferably, 50% to 100%, of the compounds of formulae IA and/or IB and/or IC-1/IC-2/IC-3 preferably used according to the invention.

The invention also relates to a method of preparation of a liquid crystalline medium describes herein, wherein at least 15% by weight or more of one or more compounds of formulae IA, 15% by weight or more of one or more compounds of formula IB and 15% by weight or more of one or more compounds of formula IC-1/-2/-3 are combined and mixed with each other and with any other optional components or additives. The resulting mixture amounts to 100% by weight.

The liquid-crystal mixtures according to the invention are prepared in a manner which is conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, for example homologue mixtures, or using so-called "multi-bottle" systems.

The liquid-crystal mixtures may also comprise further additives known to the person skilled in the art and described in the literature. For example, 0 to 15%, preferably 0 to 10%, of pleochroic dyes, chiral dopants, stabilisers or nanoparticles can be added. The individual compounds added are employed in concentrations of 0.01 to 6%, preferably 0.1 to 3%. However, the concentration data of the other constituents of the liquid-crystal mixtures, i.e. the liquid-crystalline or mesogenic compounds, are given here without taking into account the concentration of these additives.

The liquid-crystal mixtures according to the invention enable a significant broadening of the available parameter latitude.

The invention also relates to electro-optical displays (in particular TFT displays having two plane-parallel outer plates, which, together with a frame, form a cell, integrated non-linear elements for switching individual pixels on the outer plates, and a ferroelectric nematic liquid-crystal material having positive dielectric anisotropy and high specific resistance located in the cell) which contain media of this type, and to the use of these media for electro-optical purposes.

The expression "alkyl" encompasses unbranched and branched alkyl groups having 1 to 12 carbon atoms, preferably 1 to 10 carbon atoms, in particular and preferably the unbranched groups methyl, ethyl, n-propyl, n-butyl, n-pentyl, n-hexyl and n-heptyl and further, alternatively, the groups n-butyl, n-pentyl, n-hexyl and n-heptyl substituted by one methyl, ethyl or propyl. Groups having 1-5 carbon atoms are generally preferred.

The expression "alkenyl" encompasses unbranched and branched alkenyl groups having up to 12 carbon atoms, in particular the unbranched groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having 2 to 5 carbon atoms are generally preferred.

The expression "halogenated alkyl radical" preferably encompasses mono- or polyfluorinated and/or -chlorinated radicals. Perhalogenated radicals are included. Particular preference is given to fluorinated alkyl radicals, in particular $CF_3$, $CH_2CF_3$, $CH_2CHF_2$, $CHF_2$, $CH_2F$, $CHFCF_3$ and $CF_2CHFCF_3$. The expression "halogenated alkenyl radical" and related expressions are explained correspondingly.

The construction of a matrix display according to the invention from polarisers, electrode base plates and surface-treated electrodes corresponds to the usual design for displays of this type. The term usual design is broadly drawn here and also encompasses all derivatives and modifications of the matrix display, in particular also matrix display elements based on poly-Si TFTs.

An essential difference between the displays according to the invention and the hitherto conventional ones based on the twisted nematic cell consists, however, in the choice of the liquid-crystal parameters of the liquid-crystal layer.

The following examples explain the invention without intending to restrict it.

The person skilled in the art will be able to glean from the examples working details that are not given in detail in the general description, generalise them in accordance with general expert knowledge and apply them to a specific problem.

Above and below, percentage data denote percent by weight. All temperature values indicated in the present application, such as, for example, the melting point T(C,N), the smectic (Sm) to nematic (N) phase transition T(S,N) and the clearing point T(N,I), resp. T($N_f$,I), are indicated in degrees Celsius (° C.) and all temperature differences are correspondingly indicated in differential degrees (° or degrees), unless explicitly indicated otherwise. Furthermore, C=crystalline state, N=nematic phase, $N_f$=ferroelectric nematic phase, Sm=smectic phase (more especially SmA, SmB, etc.), Tg=glass-transition temperature and I=isotropic phase. The data between these symbols represent the transition temperatures. Δn denotes optical anisotropy (589 nm, 20° C.), Δε the dielectric anisotropy (1 kHz, 20° C.).

The physical, physicochemical and electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

The occurrence of the ferroelectric nematic phase of the materials is identified using differential scanning calorimetry (DSC), via observation of the textures under a polarising microscope equipped with a hot-stage for controlled cooling resp. heating and additionally confirmed by temperature dependent determination of the dielectric properties. Transition temperatures are predominantly determined by detection of the optical behaviour under a polarising microscope.

The dielectric anisotropy Δε of the individual substances is determined at 20° C. and 1 kHz. To this end, 5 to 10% by weight of the substance to be investigated are measured dissolved in the dielectrically positive mixture ZLI-4792 (Merck KGaA), and the measurement value is extrapolated to a concentration of 100%. The optical anisotropy Δn is determined at 20° C. and a wavelength of 589.3 nm by linear extrapolation.

The relative dielectric permittivity ($\varepsilon_r$) of the materials, especially in the ferroelectric nematic phase is directly determined by measuring the capacitance of at least one test cell containing the compound and having cell thickness of 250 μm with homeotropic and with homogeneous alignment, respectively. Temperature is controlled by a Novocontrol Novocool system set to temperature gradients of +/−1 K/min; +/−2 K/min; +/−5 K/min; +/−10 K/min applied to the sample cell. Capacitance is measured by a Novocontrol alpha-N analyzer at a frequency of 1 kHz or 10 Hz with a typical voltage <50 mV down to 0.1 mV in order make sure to be below the threshold of the investigated compound. Measurements are performed both upon heating and upon cooling of the sample(s).

In the present application, unless explicitly indicated otherwise, the plural form of a term denotes both the singular form and the plural form, and vice versa. Further combinations of the embodiments and variants of the invention in accordance with the description also arise from the appended claims or from combinations of a plurality of these claims.

EXAMPLES

The present invention is described in detail by the following non-restrictive examples.

COMPOUND EXAMPLES

Compound Example 1: Synthesis of UUQU-4-N

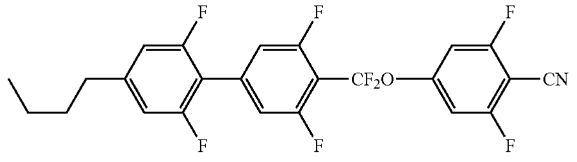

Step 1.1

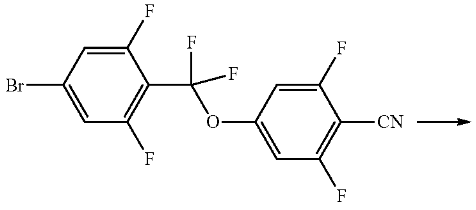

6

-continued

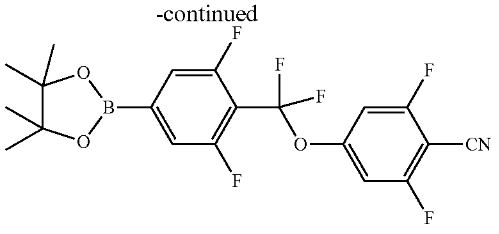

7

13.8 g (35 mmol) 1 was dissolved in 150 ml 1,4-dioxane, 1.0 g (1.4 mmol) palladium acetate, 10.4 g (0.1 mol) potassium acetate and 13.9 g (53 mmol) bis(pinacolato) boron were added. The mixture was heated under reflux overnight. After the usual workup 12.4 g (80%) of 2 was obtained as slightly yellow crystals.

Step 1.2

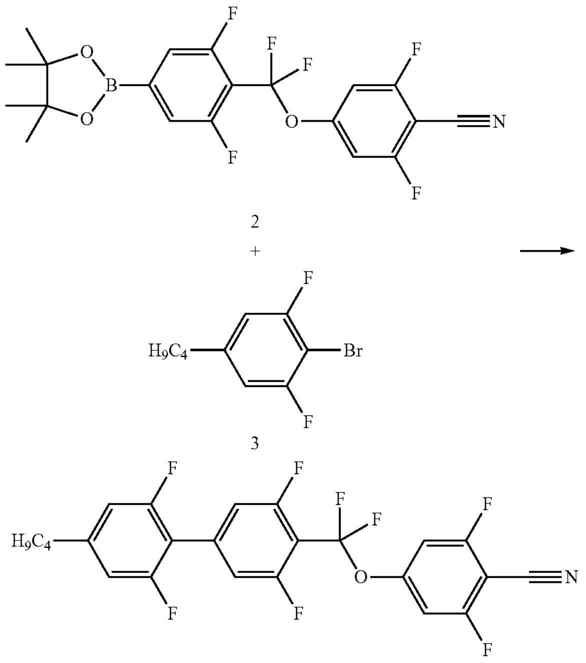

2

+

3

4

5.4 g (23 mmol) potassium phosphate was dissolved in 10 ml water. 80 ml of toluene, 2.8 g (11.4 mmol) 1-bromo-2, 6-difluoro-4-butyl benzene 3, 6.3 g (14.2 mmol) 1, 42.2 mg (0.2 mmol) palladium acetate and 126.7 mg (0.3 mmol) S-Phos (2-dicyclohexylphosphino-2',6'-dimethoxybiphenyl) were added and the mixture was heated under reflux overnight. After the usual workup 3.42 g (62%) 3 (UUQU-4-N) was obtained as colorless crystals.

$^1$H NMR (400 MHz, Chloroform-d) δ 7.16 (d, J=11.0 Hz, 2H), 7.07-6.99 (m, 2H), 6.91-6.81 (m, 2H), 2.69-2.61 (m, 2H), 1.69-1.57 (m, 2H), 1.39 (h, J=7.4 Hz, 2H), 0.96 (t, J=7.3 Hz, 3H).

Melting point: 44° C.

Monotropic ferroelectric nematic on cooling down: 21° C. and below

Data extrapolated from 10% solution in ZLI-4792:

Δn(20° C.)=0.120 and Δε(20° C.)=54.6.

Compound Example 2: Synthesis of UUZU-4-N

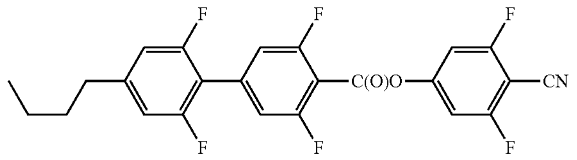

Step 2.1

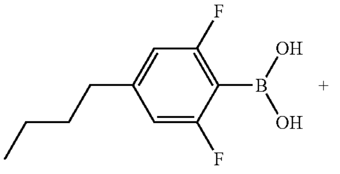

5

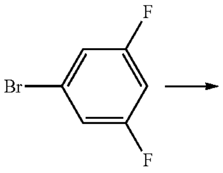

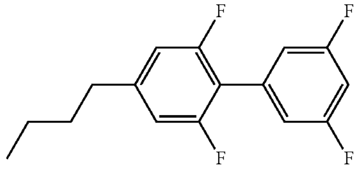

6

57.2 g (150 mmol) disodiumtetraborate-decahydrate, 2.8 g (4 mmol) palladium chloride, 0.2 g (4 mmol) hydrazinium hydroxide, 39.4 g (0.2 mol) 1-bromo-3,5-difluorobenzene, 42.8 g (0.2 mol) 5 and 200 ml of water were combined. The mixture was heated to reflux for 6 h. After the usual workup 50 g (88%) of 6 was obtained.

Step 2.2

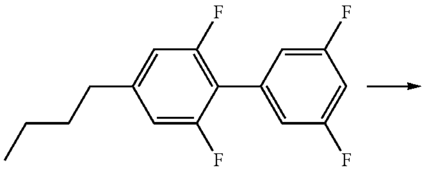

6

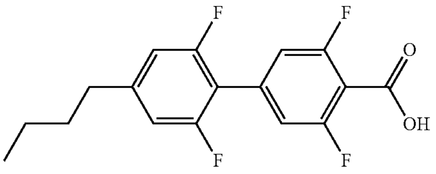

7

50 g (175 mmol) 6 was dissolved in 300 ml tetrahydrofuran and cooled to −75° C. 118 ml (193 mmol) of 15% n-butyllithium in hexane was added dropwise below −70° C. and the mixture was stirred at that temperature for 1.5 h. The mixture was poured onto 500 g of solid carbon dioxide and allowed to warm to room temperature. After the usual workup 46.8 g (82%) of 7 was obtained as colorless crystals.

Step 2.3

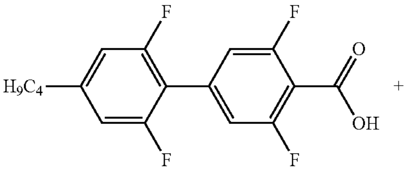

7

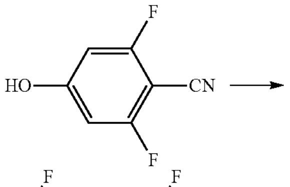

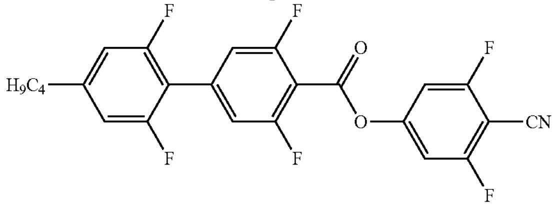

8

16.3 g (50 mmol) 7, 8.5 g (55 mmol) 1-cyano-2,6-difluoro-4-hydroxybenzene and 611 mg (5 mmol) 4-dimethylaminopyridine were combined with 200 ml dichloromethane and cooled to 0° C. Between 0 and 5° C. a solution of 11.3 g (55 mmol) N,N-dicyclohexylcarbodiimide in 50 ml dichloromethane was added dropwise. The mixture was then warmed to room temperature and stirred overnight. 1.4 g oxalic acid was added, and everything was stirred another 1.5 h. After the usual workup 20.5 g (88%) 8 (UUZU-4-N) was obtained.

$^1$H NMR (500 MHz, Chloroform-d) δ 7.23-7.17 (m, 2H), 7.15-7.08 (m, 2H), 6.91-6.83 (m, 2H), 2.69-2.62 (m, 2H), 1.69-1.59 (m, 2H), 1.39 (h, J=7.4 Hz, 2H), 0.96 (t, J=7.4 Hz, 3H).

Phases: C 69 $N_t$/N 93 I.

Data extrapolated from 10% solution in ZLI-4792: Δn(20° C.)=0.159 and Δε (20° C.)=70.3.

Further combinations of the embodiments of the current invention and variants of the invention are also disclosed by the claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

This applies both to the media as compositions with their constituents, which can be groups of compounds as well as individual compounds, and also to the groups of compounds with their respective constituents, the compounds. Only in relation to the concentration of an individual compound relative to the medium as a whole does the term comprise mean: the concentration of the compound or compounds in question is preferably 1% or more, particularly preferably 2% or more, very particularly preferably 4% or more.

For the present invention, "≤" means less than or equal to, preferably less than, and "≥" means greater than or equal to, preferably greater than.

For the present invention

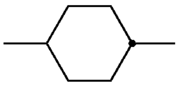 , 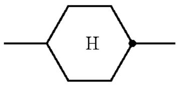 and

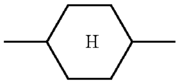

denote trans-1,4-cyclohexylene,

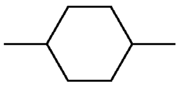

denotes a mixture of both cis- and trans-1,4-cyclohexylene and

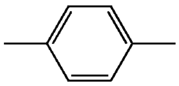 and 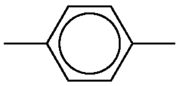

denote 1,4-phenylene.

For the present invention, the expression "dielectrically positive compounds" means compounds having a Δε of >1.5, the expression "dielectrically neutral compounds" means compounds having −1.5≤Δε≤1.5 and the expression "dielectrically negative compounds" means compounds having Δε<−1.5. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture (material) investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilisers in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

For the purposes of the present invention, all concentrations are, unless explicitly noted otherwise, indicated in percent by weight and relate to the corresponding mixture as a whole or mixture constituents, again a whole, unless explicitly indicated otherwise. In this context the term "the mixture" describes the liquid crystalline medium.

The following symbols are used, unless explicitly indicated otherwise: T(N,I) resp. $T(N_p,I)$ (or clp.)

clearing point [° C.],

Dielectric properties at 1 kHz and preferably at 20° C. or at the respective temperature specified:

$\varepsilon_\perp$ dielectric susceptibility perpendicular to the director,

ε|| dielectric susceptibility parallel to the director,

Δε dielectric anisotropy and especially for the screening data of single compounds.

And, in particular for the data from the screening of the respective compounds in the nematic host mixture ZLI-4792:

$n_e$ extraordinary refractive index measured at 20° C. and 589 nm, $n_o$ ordinary refractive index measured at 20° C. and 589 nm and Δn optical anisotropy measured at 20° C. and 589 nm.

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

Definitions of structural elements by abbreviations for use in acronyms for chemical compounds:

TABLE A

| Ring elements | |
|---|---|
| C | 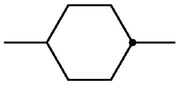 |
| D | 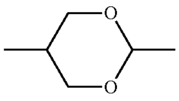 |
| DI | 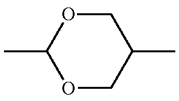 |
| A | 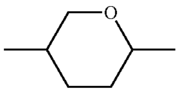 |

TABLE A-continued
| Ring elements | |
|---|---|
| AI | 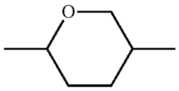 |
| P | 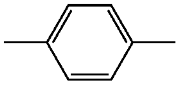 |
| G | 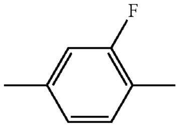 |
| GI | 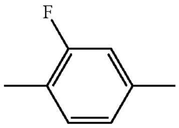 |
| U | 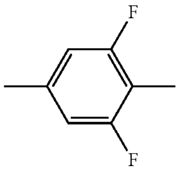 |
| UI | 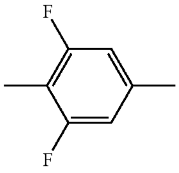 |
| Y | 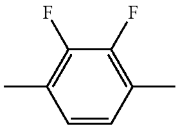 |
| M | 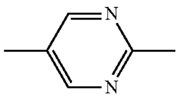 |
| P(F,Cl)Y | 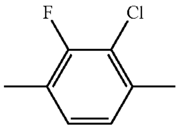 |
| P(Cl,F)Y | 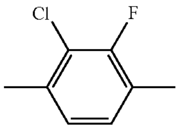 |
| np | 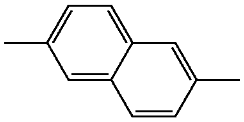 |
TABLE A-continued
| Ring elements | |
|---|---|
| n3f | 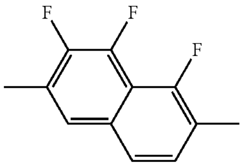 |
| nN3fl | 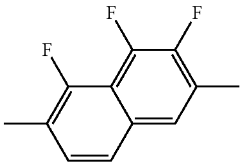 |
| th | 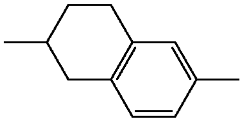 |
| thl | 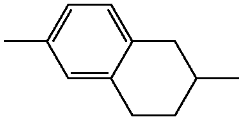 |
| tH2f | 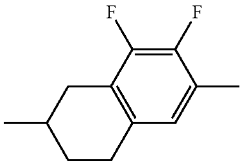 |
| tH2fl | 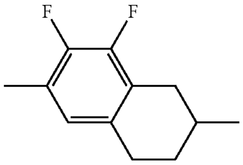 |
| o2f | 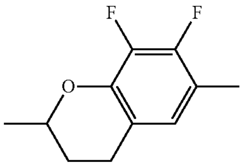 |
| o2fl | 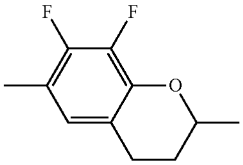 |
| dh | 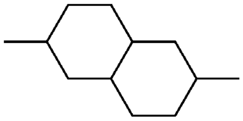 |
| B | 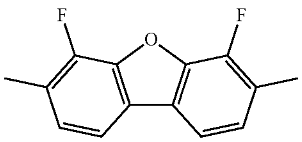 |

TABLE A-continued

| Ring elements | |
|---|---|
| O | 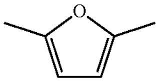 |
| S | 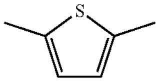 |
| K | 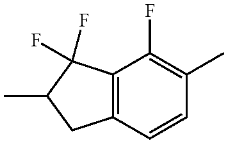 |
| KI | 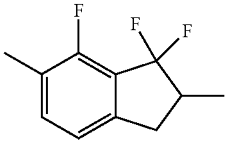 |
| L | 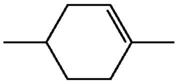 |
| LI | 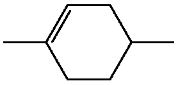 |
| F | 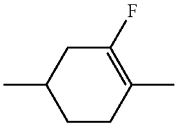 |
| FI | 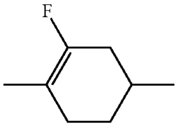 |
| Bh | 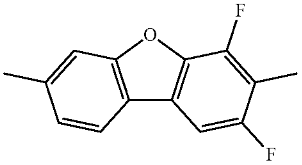 |
| Bh(S) | 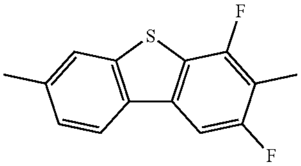 |
| Bf | 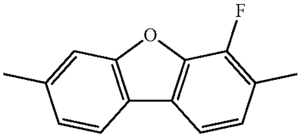 |
| Bf(S) | 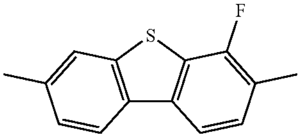 |
| Bfi | 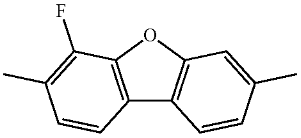 |
| Bfi(S) | 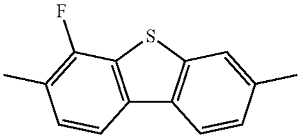 |

TABLE B

| Bridging units | | | |
|---|---|---|---|
| E | —$CH_2$—$CH_2$— | | |
| V | —CH═CH— | | |
| T | —C≡C— | | |
| W | —$CF_2$—$CF_2$— | | |
| B | —CF═CF— | | |
| Z | —CO—O— | ZI | —O—CO— |
| X | —CF═CH— | XI | —CH═CF— |
| O | —$CH_2$—O— | OI | —O—$CH_2$— |
| Q | —$CF_2$—O— | QI | —O—$CF_2$— |

TABLE C

| End groups | | | |
|---|---|---|---|
| On the left individually or in combination | | On the right individually or in combination | |
| -n- | $C_nH_{2n+1}$— | -n | —$C_nH_{2n+1}$ |
| -nO- | $C_nH_{2n+1}$—O— | -On | —O—$C_nH_{2n+1}$ |
| -V- | $CH_2$═CH— | -V | —CH═$CH_2$ |
| -nV- | $C_nH_{2n+1}$—CH═CH— | -nV | —$C_nH_{2n}$—CH═$CH_2$ |
| -Vn- | $CH_2$═CH—$C_nH_{2n}$— | -Vn | —CH═CH—$C_nH_{2n+1}$ |
| -nVm- | $C_nH_{2n+1}$—CH═CH—$C_mH_{2m}$— | -nVm | —$C_nH_{2n}$—CH═CH—$C_mH_{2m+1}$ |
| -N- | N≡C— | -N | —C≡N |
| -S- | S═C═N— | -S | —N═C═S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |

TABLE C-continued

| End groups | | | |
|---|---|---|---|
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| On the left only in combination | | On the right only in combination | |
| - . . . n . . . - | —$C_nH_{2n}$— | - . . . n . . . | —$C_nH_{2n}$— |
| - . . . M . . . - | —CFH— | - . . . M . . . | —CFH— |
| - . . . D . . . - | —$CF_2$— | - . . . D . . . | —$CF_2$— |
| - . . . V . . . - | —CH═CH— | - . . . V . . . | —CH═CH— |
| - . . . Z . . . - | —CO—O— | - . . . Z . . . | —CO—O— |
| - . . . ZI . . . - | —O—CO— | - . . . ZI . . . | —O—CO— |
| - . . . K . . . - | —CO— | - . . . K . . . | —CO— |
| - . . . W . . . - | —CF═CF— | - . . . W . . . | —CF═CF— |

in which n and m are each integers, and the three dots " . . . " are placeholders for other abbreviations from this table.

Besides the compounds of formulae IA, IB and IC-1/-2/-3 the mixtures according to the invention preferably comprise one or more compounds of the compounds mentioned below.

The following abbreviations are used:

(n, m, k and I are, independently of one another, each an integer, preferably 1 to 9 preferably 1 to 7, k and I possibly may be also 0 and preferably are 0 to 4, more preferably 0 or 2 and most preferably 2, n preferably is 1, 2, 3, 4 or 5, in the combination "-nO—" it preferably is 1, 2, 3 or 4, preferably 2 or 4, m preferably is 1, 2, 3, 4 or 5, in the combination "-Om" it preferably is 1, 2, 3 or 4, more preferably 2 or 4. The combination "-IVm" preferably is "2V1".)

For the present invention and in the following examples, the structures of the liquid-crystal compounds are indicated by means of acronyms, with the transformation into chemical formulae taking place in accordance with Tables A to C above. All radicals $C_nH_{2n+1}$, $C_mH_{2m+1}$ and $C_lH_{2l+1}$ or $C_nH_{2n}$, $C_mH_{2m}$ and $C_lH_{l2}$ are straight-chain alkyl radicals or alkylene radicals, in each case having n, m and I C atoms respectively. Preferably n, m and I are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE D

Exemplary, preferred compounds of formula IA

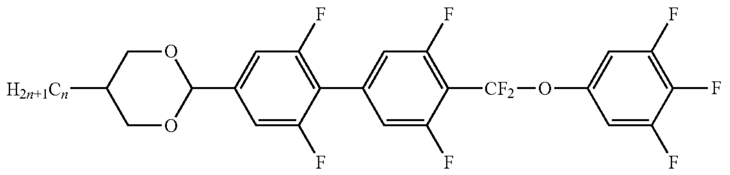

DUUQU-n-F

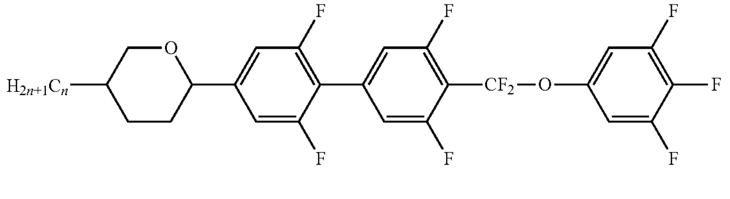

AUUQU-n-F

TABLE D-continued
Exemplary, preferred compounds of formula IA
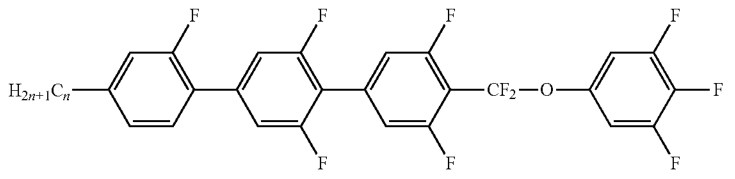
GUUQU-n-F
Exemplary, preferred compounds of formula IB
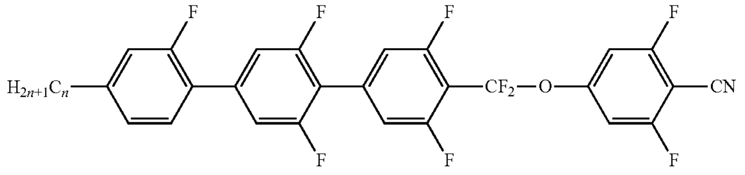
GUUQU-n-N
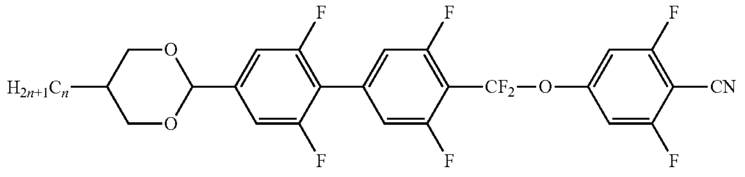
DUUQU-n-N
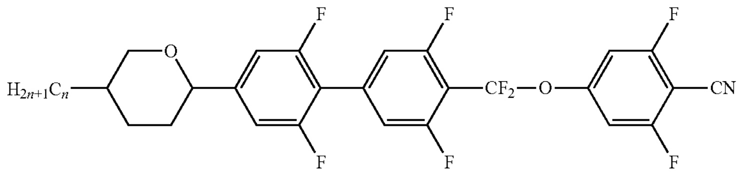
AUUQU-n-N
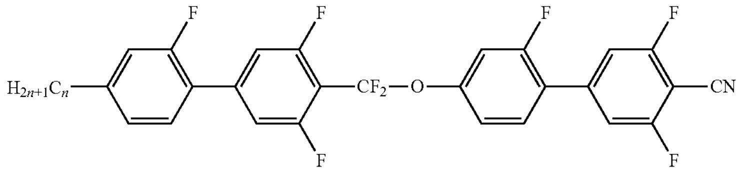
GUQGU-n-N
Exemplary, preferred compounds of formula IC-1
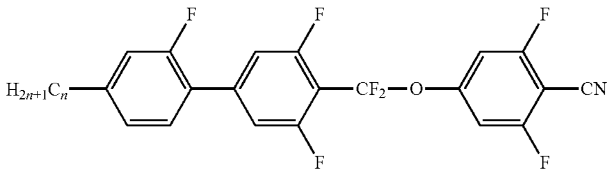
GUQU-n-N TABLE D-continued
Exemplary, preferred compounds of formula IA
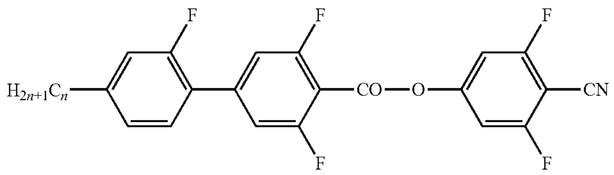
GUZU-n-N
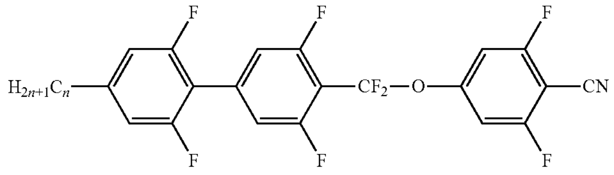
UUQU-n-N
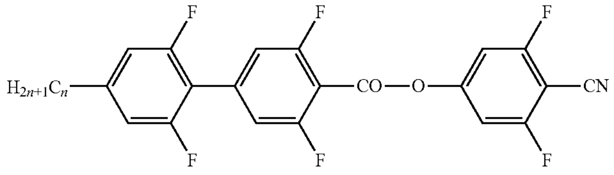
UUZU-n-N
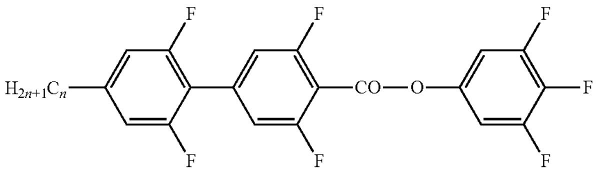
UUZU-n-F
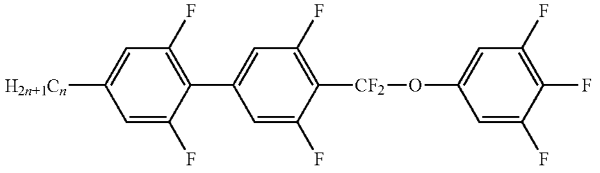
UUQU-n-F
Exemplary, preferred compounds of formula IC-3
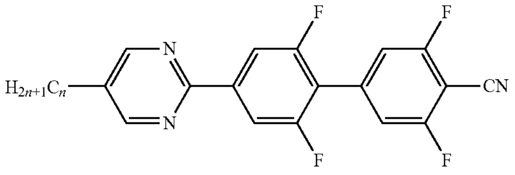
MUU-n-N
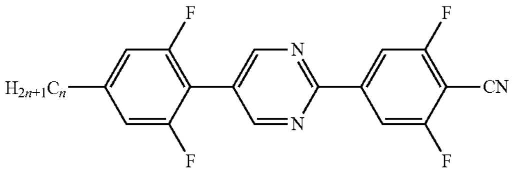
UMU-n-N TABLE D-continued
| Exemplary, preferred compounds of formula IA |
|---|
Further compounds optionally used
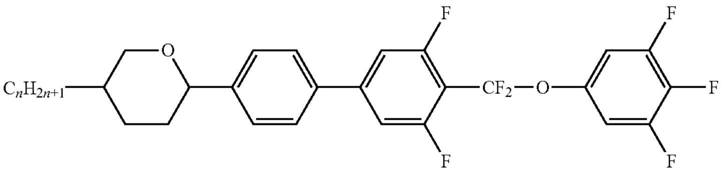
APUQU-n-F
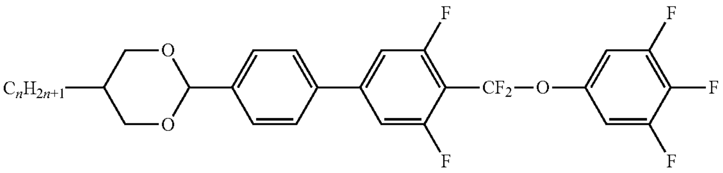
DPUQU-n-F
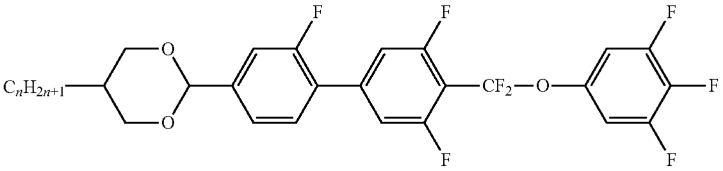
DGUQU-n-F
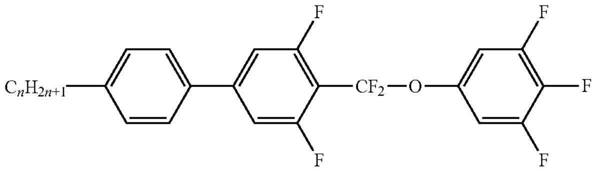
PUQU-n-F
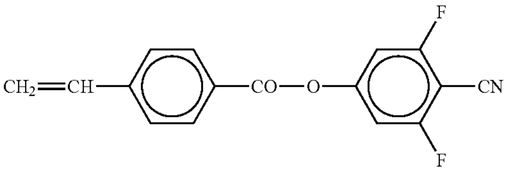
PZU-V-N
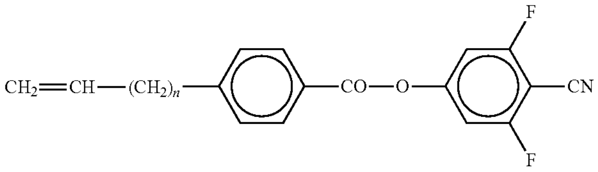
PZU-Vn-N TABLE D-continued
Exemplary, preferred compounds of formula IA
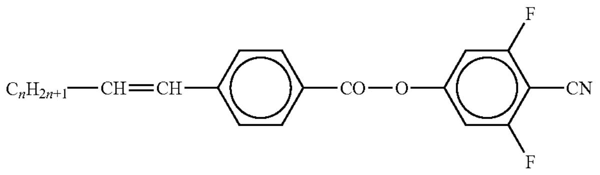
PZU-nV-N
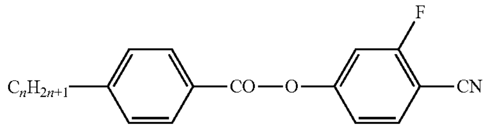
PZG-n-N
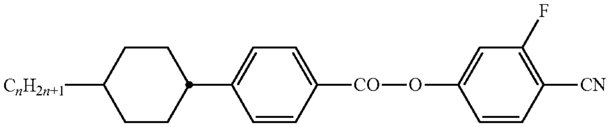
CPZG-n-N
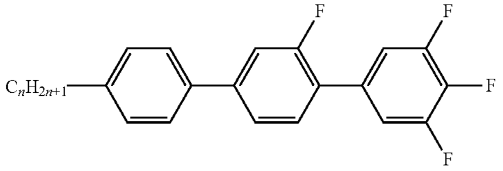
PGU-n-F
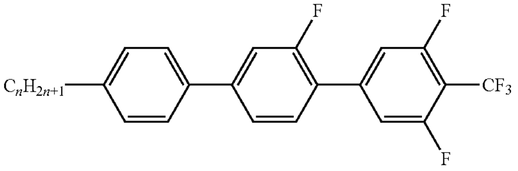
PGU-n-T
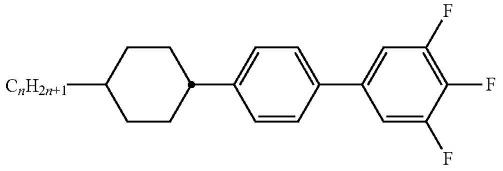
CPU-n-F
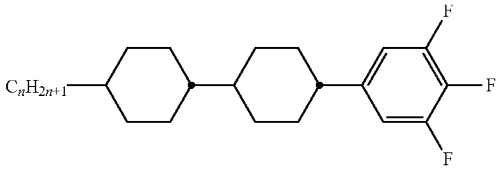
CCU-n-F
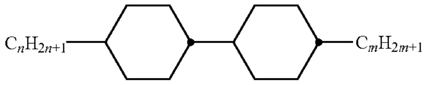
CC-n-m TABLE D-continued
Exemplary, preferred compounds of formula IA
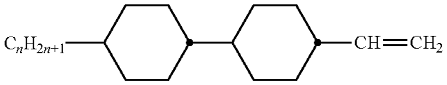
CC-n-V
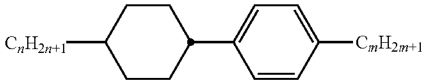
CP-n-m
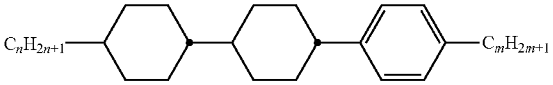
CCP-n-m
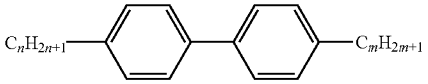
PP-n-m
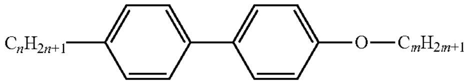
PP-n-Om
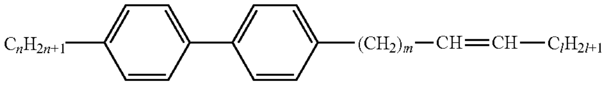
PP-n-mVl
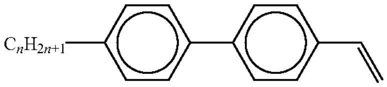
PP-n-V
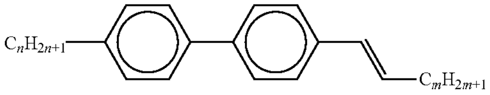
PP-n-Vm
PP-n-2Vm
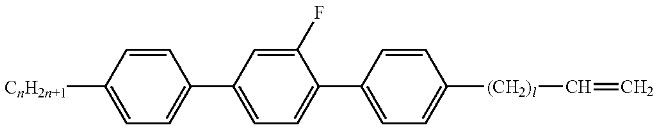
PGP-n-m
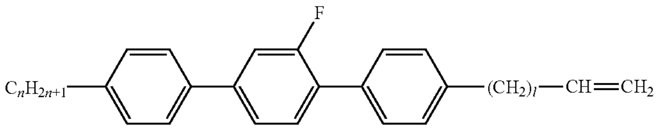
PGP-n-lV TABLE D-continued

| Exemplary, preferred compounds of formula IA |
|---|
| 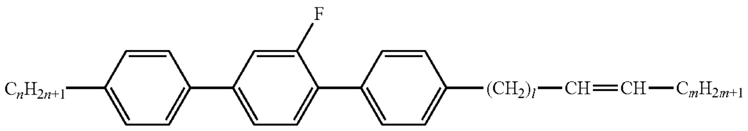 |
| PGP-n-IVm |

MIXTURE EXAMPLES

In the following exemplary mixtures are disclosed.

Mixture Example 1

The following mixture (M-1) is prepared and investigated.

| Mixture M-1 | | | |
|---|---|---|---|
| Composition | | | |
| Compound | | Concentration | |
| No. | Abbreviation | /% by weight | Physical properties |
| 1 | DUUQU-3-F | 18.0 | T(N, I) = 97° C. |
| 2 | DUUQU-4-F | 18.0 | T(FerroN) c = 52° C. |
| 3 | DUUQU-5-F | 7.0 | ε(20° C., 1 kHz) c = 3960 |
| 4 | GUUQU-3-N | 10.0 | ε(20° C., 10 Hz) c = 42200 |
| 5 | GUUQU-4-N | 13.0 | |
| 6 | GUUQU-5-N | 4.0 | |
| 7 | GUZU-4-N | 15.0 | |
| 8 | GUQU-4-N | 15.0 | |
| Σ | | 100.0 | |

c) value upon cooling,

Mixture Example 2

The following mixture (M-2) is prepared and investigated.

| Mixture M-2 | | | |
|---|---|---|---|
| Composition | | | |
| Compound | | Concentration | |
| No. | Abbreviation | /% by weight | Physical properties |
| 1 | DUUQU-3-F | 16.0 | T(N, I) = 97° C. |
| 2 | DUUQU-4-F | 16.0 | T(FerroN) c = 49° C. |
| 3 | DUUQU-5-F | 7.0 | ε(20° C., 1 kHz) c = 3220 |
| 4 | GUUQU-3-N | 10.0 | ε(20° C., 10 Hz) c = 42200 |
| 5 | GUUQU-4-N | 13.0 | |
| 6 | GUUQU-5-N | 4.0 | |
| 7 | GUZU-4-N | 13.0 | |
| 8 | GUZU-5-N | 8.0 | |
| | GUQU-4-N | 13.0 | |
| Σ | | 100.0 | |

c) value upon cooling,

Mixture Example 3

The following mixture (M-3) is prepared and investigated.

| Mixture M-3 | | | |
|---|---|---|---|
| Composition | | | |
| Compound | | Concentration | |
| No. | Abbreviation | /% by weight | Physical properties |
| 1 | DUUQU-3-F | 15.0 | T(N, I) = 96° C. |
| 2 | DUUQU-4-F | 14.0 | T(FerroN) c = 41° C. |
| 3 | DUUQU-5-F | 6.0 | no = t.b.d. |
| 4 | GUUQU-3-N | 9.0 | ne = t.b.d. |
| 5 | GUUQU-4-N | 12.0 | ε(20° C., 1 kHz) c = 4060 |
| 6 | GUUQU-5-N | 4.0 | ε(20° C., 10 Hz) c = 42600 |
| 7 | GUZU-4-N | 15.0 | |
| 8 | GUZU-5-N | 10.0 | |
| | GUQU-4-N | 15.0 | |
| Σ | | 100.0 | |

c) value upon cooling,

These is the highest value of the relative dielectric permittivity $\varepsilon_r$ for any physical matter known to the authors so far.

Mixture Example 4

The following mixture (M-4) is prepared and investigated.

| Mixture M-4 | | | |
|---|---|---|---|
| Composition | | | |
| Compound | | Concentration | |
| No. | Abbreviation | /% by weight | Physical properties |
| 1 | DUUQU-3-F | 14.0 | T(N, I) = 91° C. |
| 2 | DUUQU-4-F | 13.0 | T(FerroN) c = 33° C. |
| 3 | DUUQU-5-F | 5.0 | ε(20° C., 1 kHz) c = 5270 |
| 4 | GUUQU-3-N | 8.0 | ε(20° C., 10 Hz) c = 40500 |
| 5 | GUUQU-4-N | 11.0 | |
| 6 | GUUQU-5-N | 3.0 | |
| 7 | GUZU-4-N | 17.0 | |
| 8 | GUZU-5-N | 12.0 | |
| | GUQU-4-N | 17.0 | |
| Σ | | 100.0 | |

c) value upon cooling,

Mixture Example 5

The following mixture (M-5) is prepared and investigated.

| Mixture M-5 | | | |
|---|---|---|---|
| Composition | | | |
| Compound | | Concentration | |
| No. | Abbreviation | /% by weight | Physical properties |
| 1 | DUUQU-3-F | 13.0 | T(N, I) = 88° C. |
| 2 | DUUQU-4-F | 11.0 | T(FerroN) c = 25° C. |
| 3 | DUUQU-5-F | 4.0 | ε(20° C., 1 kHz) c = 5010 |
| 4 | GUUQU-3-N | 7.0 | ε(20° C., 10 Hz) c = 40200 |
| 5 | GUUQU-4-N | 10.0 | |
| 6 | GUUQU-5-N | 3.0 | |
| 7 | GUZU-4-N | 19.0 | |
| 8 | GUZU-5-N | 14.0 | |
| | GUQU-4-N | 19.0 | |
| Σ | | 100.0 | |

c) value upon cooling,

Mixture Example 6

The following mixture (M-6) is prepared and investigated.

| Mixture M-6 | | | |
|---|---|---|---|
| Composition | | | |
| Compound | | Concentration | |
| No. | Abbreviation | /% by weight | Physical properties |
| 1 | DUUQU-3-F | 12.0 | T(N, I) = 87° C. |
| 2 | DUUQU-4-F | 10.0 | T(FerroN) c = 21° C. |
| 3 | DUUQU-5-F | 4.0 | ε(20° C., 1 kHz) c = 5010 |
| 4 | GUUQU-3-N | 6.0 | ε(20° C., 10 Hz) c = 39800 |
| 5 | GUUQU-4-N | 10.0 | |
| 6 | GUUQU-5-N | 3.0 | |
| 7 | GUZU-4-N | 20.0 | |
| 8 | GUZU-5-N | 15.0 | |
| | GUQU-4-N | 20.0 | |
| Σ | | 100.0 | |

c) value upon cooling,

The following mixture (M-6) is prepared and investigated.

| Mixture M-6 | | | |
|---|---|---|---|
| Composition | | | |
| Compound | | Concentration | |
| No. | Abbreviation | /% by weight | Physical properties |
| 1 | DUUQU-3-F | 12.0 | T(N, I) = 87° C. |
| 2 | DUUQU-4-F | 10.0 | T(FerroN) c = 21° C. |
| 3 | DUUQU-5-F | 4.0 | ε(20° C., 1 kHz) c = 5010 |
| 4 | GUUQU-3-N | 6.0 | ε(20° C., 10 Hz) c = 39800 |
| 5 | GUUQU-4-N | 10.0 | |
| 6 | GUUQU-5-N | 3.0 | |
| 7 | GUZU-4-N | 20.0 | |
| 8 | GUZU-5-N | 15.0 | |
| | GUQU-4-N | 20.0 | |
| Σ | | 100.0 | |

c) value upon cooling,

Mixture Example 7

The following mixture (M-7) is prepared and investigated.

| Mixture M-7 | | | |
|---|---|---|---|
| Composition | | | |
| Compound | | Concentration | |
| No. | Abbreviation | /% by weight | Physical properties |
| 1 | DUUQU-3-F | 12.0 | T(N, I) = 88° C. |
| 2 | DUUQU-4-F | 12.0 | T(FerroN) c = 35° C. |
| 3 | DUUQU-5-F | 4.0 | ε(20° C., 1 kHz) c = t.b.d. |
| 4 | GUUQU-3-N | 7.0 | ε(20° C., 10 Hz) c = t.b.d. |
| 5 | GUUQU-4-N | 11.0 | |
| 6 | GUUQU-5-N | 3.0 | |
| 7 | GUZU-4-N | 15.0 | |
| 8 | GUZU-5-N | 10.0 | |
| 9 | GUQU-4-N | 15.0 | |
| 10 | UUZU-4-N | 3.0 | |
| 11 | UUZU-5-N | 3.0 | |
| 12 | UUQU-5-N | 5.0 | |
| Σ | | 100.0 | |

Remark: t.b.d.: to be determined.
c) value upon cooling,

Mixture Example 8

The following mixture (M-8) is prepared and investigated.

| Mixture M-8 | | | |
|---|---|---|---|
| Composition | | | |
| Compound | | Concentration | |
| No. | Abbreviation | /% by weight | Physical properties |
| 1 | DUUQU-3-F | 12.0 | T(N, I) = 88° C. |
| 2 | DUUQU-4-F | 12.0 | T(FerroN) c = 39° C. |
| 3 | DUUQU-5-F | 4.0 | ε(20° C., 1 kHz) c = t.b.d. |
| 4 | GUUQU-3-N | 7.0 | ε(20° C., 10 Hz) c = t.b.d. |
| 5 | GUUQU-4-N | 11.0 | |
| 6 | GUUQU-5-N | 3.0 | |
| 7 | GUZU-4-N | 13.0 | |
| 8 | GUZU-5-N | 8.0 | |
| 9 | GUQU-4-N | 13.0 | |
| 10 | UUZU-4-N | 5.0 | |
| 11 | UUZU-5-N | 5.0 | |
| 12 | UUQU-5-N | 7.0 | |
| Σ | | 100.0 | |

Remark: t.b.d.: to be determined.
c) value upon cooling,

Mixture Example 9

The following mixture (M-9) is prepared and investigated.

| Mixture M-9 | | | |
|---|---|---|---|
| Composition | | | |
| Compound | | Concentration | |
| No. | Abbreviation | /% by weight | Physical properties |
| 1 | DUUQU-3-F | 12.0 | T(N, I) = 89° C. |
| 2 | DUUQU-4-F | 12.0 | T(FerroN) c = 44° C. |
| 3 | DUUQU-5-F | 4.0 | ε(20° C., 1 kHz) c = t.b.d. |
| 4 | GUUQU-3-N | 7.0 | ε(20° C., 10 Hz) c = t.b.d. |
| 5 | GUUQU-4-N | 11.0 | |
| 6 | GUUQU-5-N | 3.0 | |
| 7 | GUZU-4-N | 11.0 | |
| 8 | GUZU-5-N | 6.0 | |
| 9 | GUQU-4-N | 11.0 | |
| 10 | UUZU-4-N | 7.0 | |
| 11 | UUZU-5-N | 7.0 | |
| 12 | UUQU-5-N | 9.0 | |
| Σ | | 100.0 | |

Remark: t.b.d.: to be determined.
c) value upon cooling,

Mixture Example 10

The following mixture (M-10) is prepared and investigated.

| Mixture M-10 | | | |
|---|---|---|---|
| Composition | | | |
| Compound | | Concentration | |
| No. | Abbreviation | /% by weight | Physical properties |
| 1 | DUUQU-3-F | 10.0 | T(N, I) = 82° C. |
| 2 | DUUQU-4-F | 12.0 | T(FerroN)c = 44° C. |
| 3 | DUUQU-5-F | 4.0 | |
| 4 | GUUQU-3-N | 4.0 | |
| 5 | GUUQU-4-N | 11.0 | |
| 6 | GUUQU-5-N | 3.0 | |
| 7 | GUZU-4-N | 11.0 | |
| 8 | GUZU-5-N | 6.0 | |
| 9 | GUQU-4-N | 10.0 | |
| 10 | UUZU-4-N | 7.0 | |
| 11 | UUZU-5-N | 7.0 | |
| 12 | UUQU-3-N | 5.0 | |
| 12 | UUQU-4-N | 7.0 | |
| 13 | UUQU-5-N | 3.0 | |
| Σ | | 100.0 | |

Mixture Example 11

The following mixture (M-11) is prepared and investigated.

| Mixture M-11 | | | |
|---|---|---|---|
| Composition | | | |
| Compound | | Concentration | |
| No. | Abbreviation | /% by weight | Physical properties |
| 1 | MUU-4-N | 10.0 | T(N, I) = 107° C. |
| 2 | MUU-5-N | 5.0 | T(FerroN) c = 30° C. |
| 3 | UMU-4-N | 10.0 | ε(20° C., 1 kHz) c= |
| 4 | UMU-5-N | 5.0 | ε(20° C., 10 Hz) c= |
| 5 | UMU-6-N | 5.0 | |
| 6 | GUUQU-3-N | 15.0 | |
| 7 | GUUQU-4-N | 10.0 | |
| 8 | GUUQU-5-N | 10.0 | |
| 9 | DUUQU-3-F | 10.0 | |
| 10 | DUUQU-4-F | 10.0 | |
| 11 | DUUQU-5-F | 10.0 | |
| Σ | | 100.0 | |

c) value upon cooling,

Mixture Example 12

The following mixture (M-12) is prepared and investigated.

| Mixture M-12 | | | |
|---|---|---|---|
| Composition | | | |
| Compound | | Concentration | |
| No. | Abbreviation | /% by weight | Physical properties |
| 1 | MUU-4-N | 7.0 | T(N, I) = 108° C. |
| 2 | MUU-5-N | 4.0 | T(Ferro) c = 28° C. |
| 3 | UMU-4-N | 7.0 | ε(20° C., 1 kHz)c= |
| 4 | UMU-5-N | 4.0 | ε(20° C., 10 Hz)c= |
| 5 | UMU-6-N | 3.0 | |
| 6 | GUUQU-3-N | 15.0 | |
| 7 | GUUQU-4-N | 13.0 | |
| 8 | GUUQU-5-N | 12.0 | |
| 9 | DUUQU-3-F | 7.0 | |
| 10 | DUUQU-4-F | 9.0 | |
| 11 | DUUQU-5-F | 4.0 | |
| 12 | GUZU-4-N | 5.0 | |
| 13 | GUZU-5-N | 5.0 | |
| 14 | GUQU-4-N | 5.0 | |
| Σ | | 100.0 | |

c) value upon cooling,

Mixture Example 13

The following mixture (M-13) is prepared and investigated.

| Mixture M-13 | | | |
|---|---|---|---|
| Composition | | | |
| Compound | | Concentration | |
| No. | Abbreviation | /% by weight | Physical properties |
| 1 | MUU-5-N | 4.0 | T(N, I) = 104° C. |
| 2 | UMU-4-N | 7.0 | T(FerroN) c = 30° C. |
| 3 | UMU-5-N | 4.0 | ε(20° C., 1 kHz) c= |
| 4 | GUUQU-3-N | 13.0 | ε(20° C., 10 Hz) c= |
| 5 | GUUQU-4-N | 13.0 | |
| 6 | GUUQU-5-N | 12.0 | |
| 7 | DUUQU-3-F | 9.0 | |
| 8 | DUUQU-4-F | 9.0 | |

-continued

| Mixture M-13 | | | |
|---|---|---|---|
| Composition | | | |
| Compound | | Concentration | |
| No. | Abbreviation | /% by weight | Physical properties |
| 9 | DUUQU-5-F | 4.0 | |
| 10 | GUZU-4-N | 10.0 | |
| 11 | GUZU-5-N | 5.0 | |
| 12 | GUQU-4-N | 10.0 | |
| Σ | | 100.0 | |

c) value upon cooling,

Mixture Example 14

The following mixture (M-14) is prepared and investigated.

| Mixture M-14 | | | |
|---|---|---|---|
| Composition | | | |
| Compound | | Concentration | |
| No. | Abbreviation | /% by weight | Physical properties |
| 1 | MUU-5-N | 6.0 | T(N, I) = 103° C. |
| 2 | UMU-4-N | 8.0 | T(FerroN) c = 20° C. |
| 3 | UMU-5-N | 6.0 | ε(20° C., 1 kHz) c= |
| 4 | GUUQU-3-N | 13.0 | ε(20° C., 10 Hz) c= |
| 5 | GUUQU-4-N | 13.0 | |
| 6 | GUUQU-5-N | 12.0 | |
| 7 | DUUQU-3-F | 7.0 | |
| 8 | DUUQU-4-F | 7.0 | |
| 9 | DUUQU-5-F | 3.0 | |
| 10 | GUZU-4-N | 10.0 | |
| 11 | GUZU-5-N | 5.0 | |
| 12 | GUQU-4-N | 10.0 | |
| Σ | | 100.0 | |

c) value upon cooling,

Device Example 1

A capacitor comprising two glass substrates with ITO electrodes is filled with a layer of 110 μm of dielectric consisting of the medium of Mixture Example 1. A capacitance of 1.41 μF is determined using a 10 Hz alternating voltage. The resulting relative dielectric permittivity ($\varepsilon_r$) of the medium is $4.2 \cdot 10^4$.

The invention claimed is:

1. A liquid crystalline medium comprising

15% by weight or more of one or more compounds of formula IA,

IA

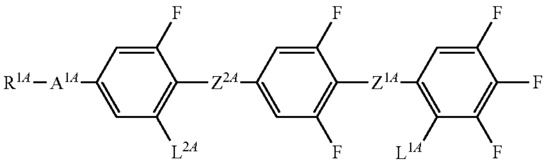

15% by weight or more of one or more of compounds of formula IB,

IB

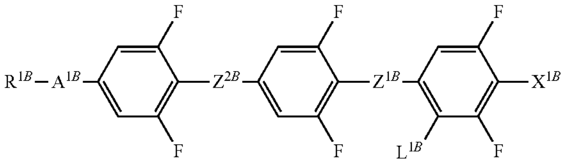

and

15% by weight or more of one or more compounds selected from formula IC-1 to IC-3,

IC-1

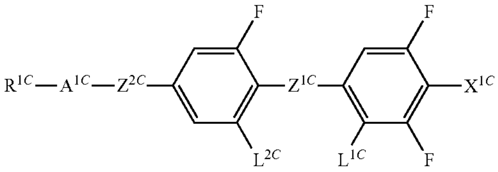

IC-2

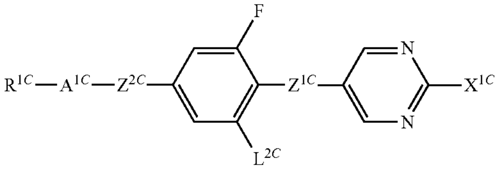

IC-3

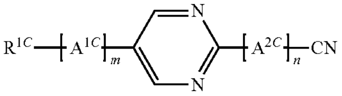

in which $X^{1B}$ denotes —CN or —NCS, $X^{1C}$ denotes —CN, F, $CF_3$, —$OCF_3$, —NCS, $SF_5$ or O—CF═$CF_2$, $Z^{1A}$ and $Z^{1B}$ independently of one another denote —(CO)—O— or —$CF_2$—O— or a single bond, $Z^{2A}$ and $Z^{2B}$ independently of one another denote a single bond, —(CO)—O— or —$CF_2$—O—, $Z^{1C}$ and $Z^{2C}$ one of the both of these groups denotes —(CO)—O— or —$CF_2$—O— and the other a single bond, $L^{1A}$, $L^{1B}$ and $L^{1C}$ independently of each other denote H or $CH_3$, $L^{2A}$ is F or H, $L^{2C}$ is F or H, $A^{1A}$ denotes

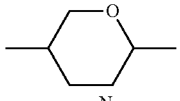 , 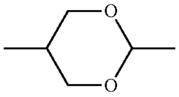 ,

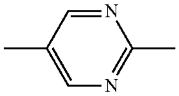 , 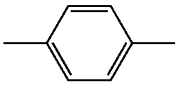 or

-continued

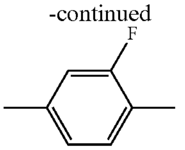, $A^{1B}$ denotes

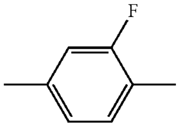, 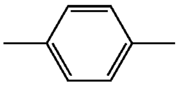,

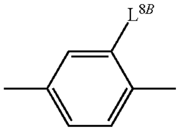, 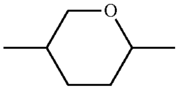,

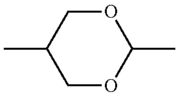 or 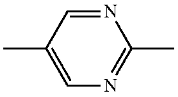, wherein $L^{8B}$ denotes alkyl having 1 to 7 C atoms, alkoxy having 1 to 7 C atoms, or alkoxyalkyl having 2 to 7 C atoms, $A^{1C}$ denotes

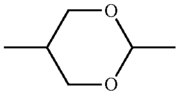, 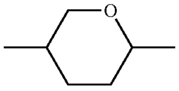, 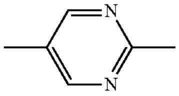,

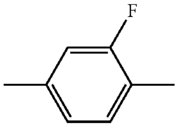 or 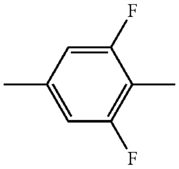, $A^{2C}$ denotes

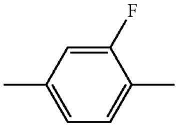 or 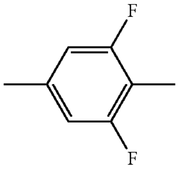, m, n is 0, 1 or 2, where (m+n) is 2, $R^{1A}$, $R^{1B}$ and $R^{1C}$ independently of each another denote an alkyl radical having 1 to 12 C atoms, in which one or more $CH_2$ groups may in each case be replaced, independently of one another, by —C≡C—, —$CF_2$—O—, —$OCF_2$—, —CH=CH—,

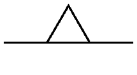, 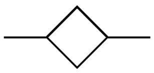, 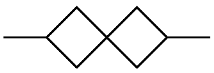,

-continued

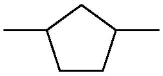, 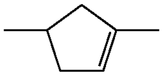,

—O—, —S—, —(CO)—O—, or —O—(CO)— in such a way that O/S atoms are not linked directly to one another, and in which one or more H atoms may each be replaced by halogen, or denotes H;

and wherein said medium exhibits a ferroelectric nematic phase, and the concentration of the compounds of formulae IA, IB, IC-1, IC-2 and IC-3 in sum, which are present, is 80% to 100% by weight.

2. The liquid crystalline medium according to claim 1, wherein said medium exhibits a relative dielectric permittivity Er of 700 or more at 20° C. and 1 kHz.

3. A liquid crystalline medium comprising

15% by weight or more of one or more compounds of formula IA,

IA

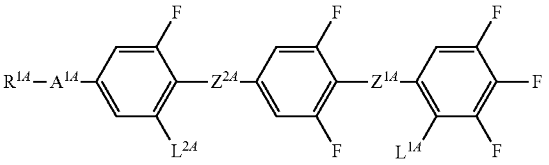

15% by weight or more of one or more of compounds of formula IB,

IB

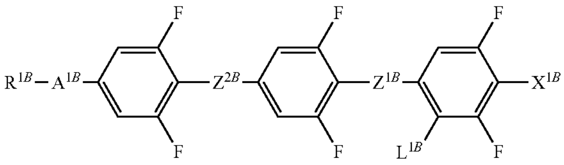

and

15% by weight or more of one or more compounds selected from formula IC-1 to IC-3,

IC-1

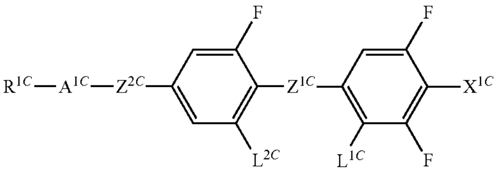

IC-2

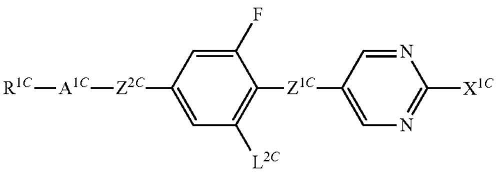

-continued

IC-3

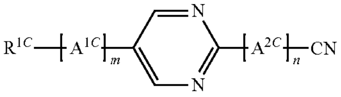

in which $X^{1B}$ denotes —CN or —NCS, $X^{1C}$ denotes —CN, F, $CF_3$, —$OCF_3$, —NCS, $SF_5$ or O—CF═$CF_2$, $Z^{1A}$ and $Z^{1B}$ independently of one another denote —(CO)—O— or —$CF_2$—O— or a single bond, $Z^{2A}$ and $Z^{2B}$ independently of one another denote a single bond, —(CO)—O— or —$CF_2$—O—, $Z^{1C}$ and $Z^{2C}$ one of the both of these groups denotes —(CO)—O— or —$CF_2$—O— and the other a single bond, $L^{1A}$, $L^{1B}$ and $L^{1C}$ independently of each other denote H or $CH_3$, $L^{2A}$ is F or H, $L^{2C}$ is F or H, $A^{1A}$ denotes

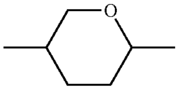 , 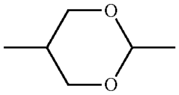 ,

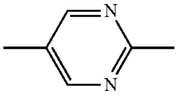 , 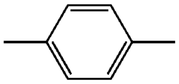 or

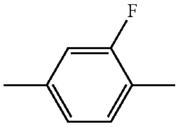 , $A^{1B}$ denotes

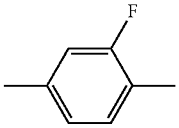 , 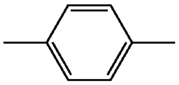 ,

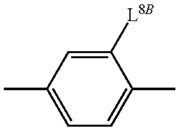 , 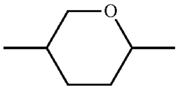 ,

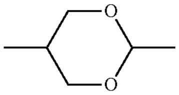 or 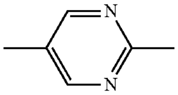 , wherein $L^{8B}$ denotes alkyl having 1 to 7 C atoms, alkoxy having 1 to 7 C atoms, or alkoxyalkyl having 2 to 7 C atoms, $A^{1C}$ denotes

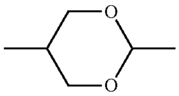 , 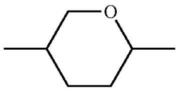 , 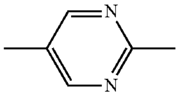 ,

-continued

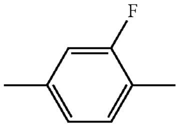 or 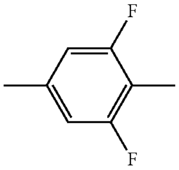 , $A^{2C}$ denotes

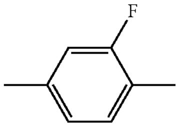 or 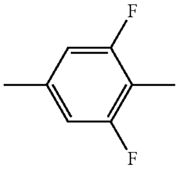 , m, n is 0, 1 or 2, where (m+n) is 2, $R^{1A}$, $R^{1B}$ and $R^{1C}$ independently of each another denote an alkyl radical having 1 to 12 C atoms, in which one or more $CH_2$ groups may in each case be replaced, independently of one another, by —C≡C—, —$CF_2$—O—, —$OCF_2$—, —CH═CH—,

 , 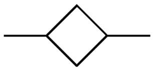 , 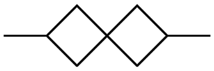 ,

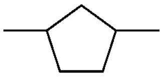 , 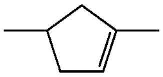 ,

—O—, —S—, —(CO)—O—, or —O—(CO)— in such a way that O/S atoms are not linked directly to one another, and in which one or more H atoms may each be replaced by halogen, or denotes H;

and wherein said medium exhibits a ferroelectric nematic phase, and the concentration of the compounds of formulae IA, IB, IC-1, IC-2 and IC-3 in sum, which are present, is 80% to 100% by weight.

4. The liquid crystalline medium according to claim 1, further comprising one or more compounds selected from compounds of formulae ID-1 to ID-4,

ID-1

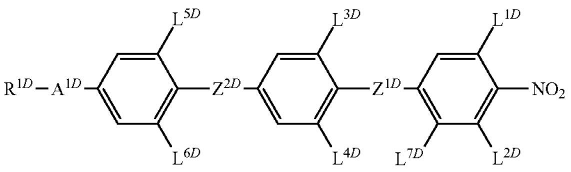

ID-2

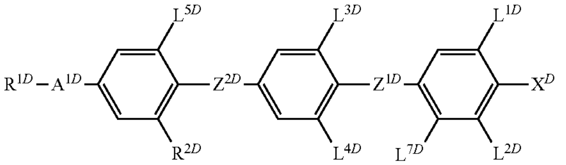

-continued

ID-3

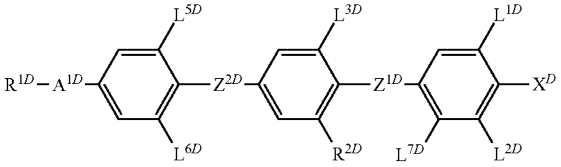

ID-4

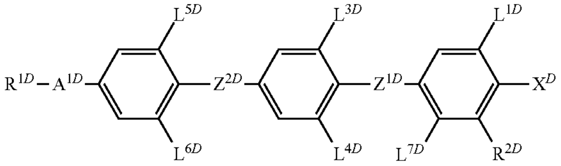

in which $X^D$ denotes CN, F, $CF_3$, —$OCF_3$, NCS, $SF_5$ or O—CF═$CF_2$, $L^{1D}$, $L^{2D}$, $L^{3D}$ $L^{4D}$, $L^{5D}$, $L^{6D}$ and $L^{7D}$, independently denote F, H, alkyl having 1 to 7 C atoms, alkoxy having 1 to 7 C atoms, or alkoxyalkyl having 2 to 7 C atoms, $Z^{1D}$ and $Z^{2D}$ independently of one another denote —(CO)—O—, —$CF_2$—O—, or a single bond, $R^{1D}$ denotes an alkyl radical having 1 to 12 C atoms, in which one or more $CH_2$ groups may in each case be replaced, independently of one another, by —C≡C—, —$CF_2$—O—, —$OCF_2$—, —CH═CH—,

, 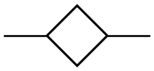, 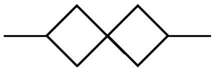, 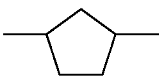, 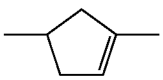,

—O—, —S—, —(CO)—O—, or —O—(CO)— in such a way that O/S atoms are not linked directly to one another, and in which one or more H atoms may each be replaced by halogen, or denotes H, $R^{2D}$ denotes alkyl having 1 to 7 C atoms, alkoxy having 1 to 7 C atoms, or alkoxyalkyl having 2 to 7 C atoms, $A^{1D}$ denotes a single bond,

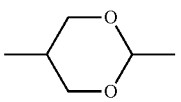, 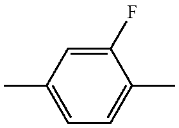,

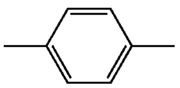, 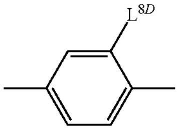,

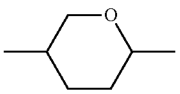 or 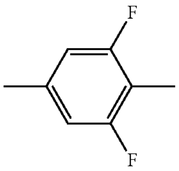

wherein $L^{8D}$ denotes alkyl having 1 to 7 C atom, alkoxy having 1 to 7 C atom, or alkoxyalkyl having 2 to 7 C atoms.

5. The medium according to claim 1, wherein the medium exhibits a ferroelectric nematic phase at a temperature of 10° C. to 30° C.

6. The medium according to claim 1, wherein the medium exhibits a hysteresis in its dielectric properties over varying temperature.

7. The medium according to claim 1, wherein the medium exhibits a ferroelectric nematic phase over a temperature range of 20 Kelvin or more.

8. An electro-mechanic device, electric generator or actuator, comprising the medium according to claim 1.

9. A supercapacitor, comprising the liquid crystalline medium according to claim 1.

10. A non-linear optic element, sensor or memory device, comprising the liquid crystalline medium according to claim 1.

11. An electro-optical liquid-crystal display, comprising the liquid crystalline medium according to claim 1.

12. A method for preparing the liquid crystalline medium according to claim 1, comprising combining and mixing at least one or more compounds of formulae IA, one or more compounds of formula IB and one or more compounds selected of formula IC-1 to IC-3 with each other.

13. The liquid crystalline medium according to claim 4, wherein $Z^{1D}$ and $Z^{2D}$, both denote —(CO)—O—.

14. The liquid crystalline medium according to claim 4, wherein $R^{2D}$ denotes $CH_3$, $OCH_3$, $OCH_2CH_3$, $CH_2OCH_3$, $CH_2OCH_2CH_3$, $CH_2CH_2OCH_3$, $CH_2CH_2OCH_2CH_3$ or $CH_2CH_2CH_2OCH_3$.

15. The liquid crystalline medium according to claim 4, wherein $L^{8D}$ denotes $CH_3$, $OCH_3$, $OCH_2CH_3$, $CH_2OCH_3$, $CH_2OCH_2CH_3$, $CH_2CH_2OCH_3$, $CH_2CH_2OCH_2CH_3$ or $CH_2CH_2CH_2OCH_3$.

16. The liquid crystalline medium according to claim 14, wherein $L^{8D}$ denotes $CH_3$, $OCH_3$, $OCH_2CH_3$, $CH_2OCH_3$, $CH_2OCH_2CH_3$, $CH_2CH_2OCH_3$, $CH_2CH_2OCH_2CH_3$ or $CH_2CH_2CH_2OCH_3$.

17. The liquid crystalline medium according to claim 1, wherein the concentration of the compounds of formulae IA, IB, IC-1, IC-2 and IC-3 in sum, which are present, is 90% to 100% by weight.

18. The liquid crystalline medium according to claim 1, wherein the concentration of the compounds of formulae IA, IB, IC-1, IC-2 and IC-3 in sum, which are present, is 98% to 100% by weight.

19. A liquid crystalline medium consisting of 15% by weight or more of one or more compounds of formula IA,

IA

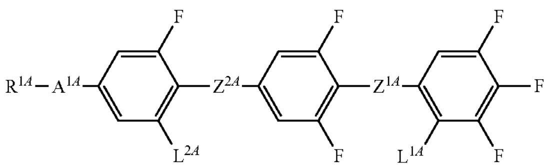

15% by weight or more of one or more of compounds of formula IB,

IB

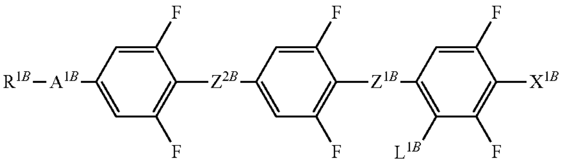

and

15% by weight or more of one or more compounds selected from formula IC-1 to IC-3,

IC-1

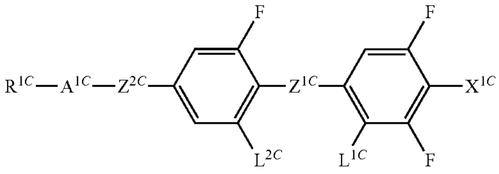

IC-2

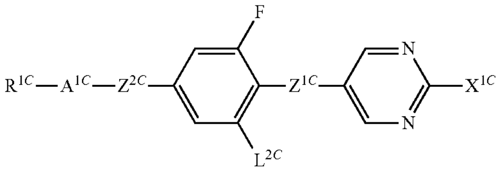

IC-3

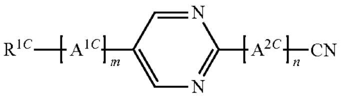

in which $X^{1B}$ denotes —CN or —NCS, $X^{1C}$ denotes —CN, F, $CF_3$, —$OCF_3$, —NCS, $SF_5$ or O—CF═$CF_2$, $Z^{1A}$ and $Z^{1B}$ independently of one another denote —(CO)—O— or —$CF_2$—O— or a single bond, $Z^{2A}$ and $Z^{2B}$ independently of one another denote a single bond, —(CO)—O— or —$CF_2$—O—, $Z^{1C}$ and $Z^{2C}$ one of the both of these groups denotes —(CO)—O— or —$CF_2$—O— and the other a single bond, $L^{1A}$, $L^{1B}$ and $L^{1C}$ independently of each other denote H or $CH_3$, $L^{2A}$ is F or H, $L^{2C}$ is F or H, $A^{1A}$ denotes

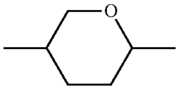 , 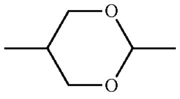 ,

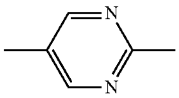 ,  or

-continued

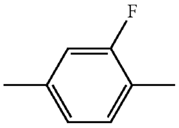 , $A^{1B}$ denotes

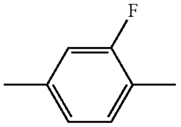 , 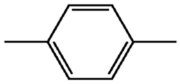 ,

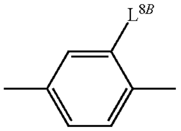 , 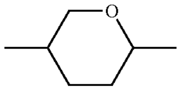 ,

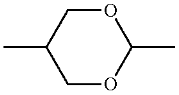 or 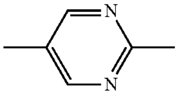 , wherein $L^{8B}$ denotes alkyl having 1 to 7 C atoms, alkoxy having 1 to 7 C atoms, or alkoxyalkyl having 2 to 7 C atoms, $A^{1C}$ denotes

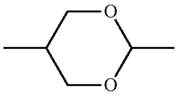 , 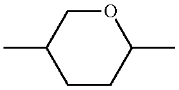 ,

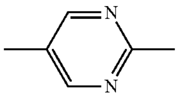 , 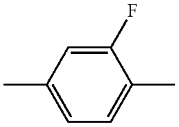 or

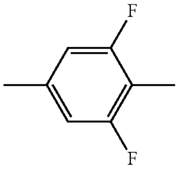 , $A^{2C}$ denotes

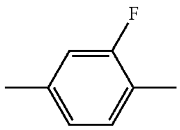 or 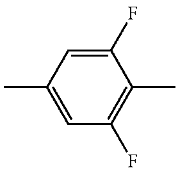 , m, n is 0, 1 or 2, where (m+n) is 2, $R^{1A}$, $R^{1B}$ and $R^{1C}$ independently of each another denote an alkyl radical having 1 to 12 C atoms, in which one or more $CH_2$ groups may in each case be replaced, independently of one another, by —C≡C—, —$CF_2$—O—, —$OCF_2$—, —CH═CH—,

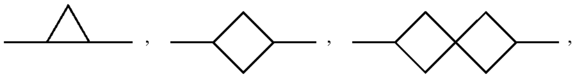

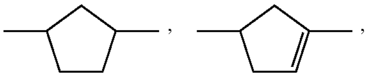

—O—, —S—, —(CO)—O—, or —O—(CO)— in such a way that O/S atoms are not linked directly to one another, and in which one or more H atoms may each be replaced by halogen, or denotes H;

and wherein said medium exhibits a ferroelectric nematic phase.

20. The liquid crystalline medium according to claim 3, further comprising one or more compounds selected from compounds of formulae IC-1-3 to IC-3-5:

IC-1-3

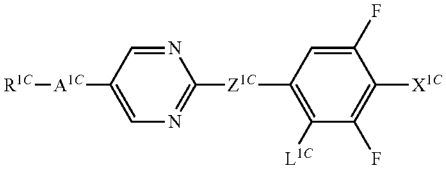

IC-2-1

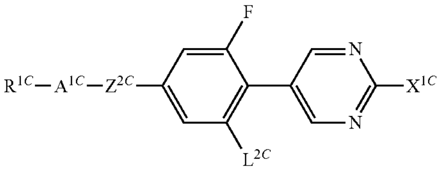

IC-3-1

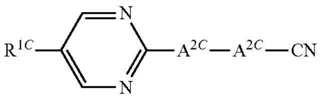

IC-3-2

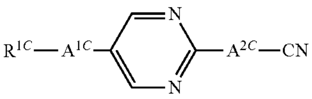

IC-3-3

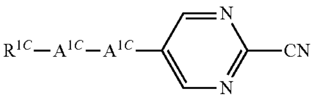

IC-3-4

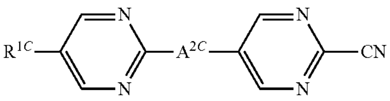

IC-3-5

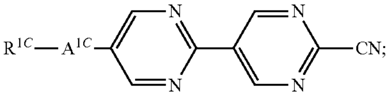

wherein $R^{1C}$ denotes an alkyl radical having 1 to 12 C atoms, in which one or more $CH_2$ groups may in each case be replaced, independently of one another, by —C≡C—, $CF_2$—O—, —$OCF_2$—, —CH═CH—,

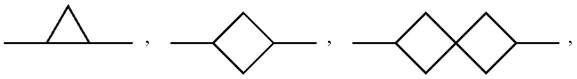

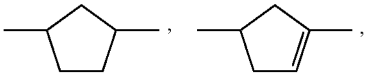

—O—, —S—, —(CO)—O—, or —O—(CO)— in such a way that O/S atoms are not linked directly to one another, and in which one or more H atoms may each be replaced by halogen, or denotes H;

$A^{1C}$ denotes

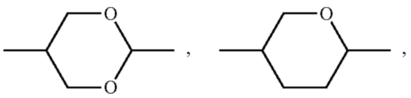

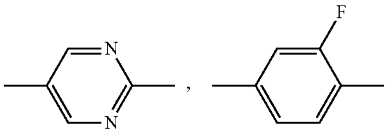

or

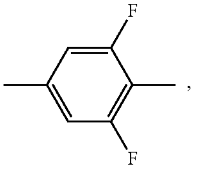

$Z^{1C}$ and $Z^{2C}$ one of the both of these groups denotes —(CO)—O— or —$CF_2$—O— and the other a single bond, $X^{1C}$ denotes —CN, F, $CF_3$, —$OCF_3$, —NCS, $SF_5$ or O—CF═$CF_2$, $L^{1C}$ is H or $CH_2$, $L^{2C}$ is F or H, and $A^{2C}$ denotes

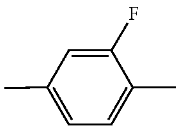

or

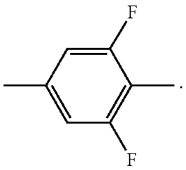

* * * * *